United States Patent
Thompson, III et al.

(10) Patent No.: US 12,343,698 B2
(45) Date of Patent: Jul. 1, 2025

(54) POLYAMINE PHOSPHORUS DENDRIMER MATERIALS FOR METAL SEQUESTRATION

(71) Applicant: RESEARCH TRIANGLE INSTITUTE, Research Triangle Park, NC (US)

(72) Inventors: Samuel John Thompson, III, Durham, NC (US); Mustapha Soukri, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 640 days.

(21) Appl. No.: 17/423,586

(22) PCT Filed: Jan. 16, 2020

(86) PCT No.: PCT/US2020/013855
§ 371 (c)(1),
(2) Date: Jul. 16, 2021

(87) PCT Pub. No.: WO2020/150457
PCT Pub. Date: Jul. 23, 2020

(65) Prior Publication Data
US 2023/0101316 A1 Mar. 30, 2023

Related U.S. Application Data

(60) Provisional application No. 62/793,644, filed on Jan. 17, 2019.

(51) Int. Cl.
*B01J 20/04* (2006.01)
*B01J 20/32* (2006.01)
(Continued)

(52) U.S. Cl.
CPC ......... *B01J 20/048* (2013.01); *B01J 20/3268* (2013.01); *B01J 20/34* (2013.01); *C02F 1/285* (2013.01); *C02F 1/288* (2013.01)

(58) Field of Classification Search
None
See application file for complete search history.

(56) References Cited

U.S. PATENT DOCUMENTS

| | | |
|---|---|---|
| 5,474,767 A | 12/1995 | Tremont |
| 7,763,684 B2 | 7/2010 | Dozol |

(Continued)

FOREIGN PATENT DOCUMENTS

WO 2016011032 1/2016

OTHER PUBLICATIONS

Caminade et al, Molecules 2018, 23, 622; doi: 10.3390/molecules23030622 (Year: 2018).*

(Continued)

*Primary Examiner* — Krishnan S Menon
(74) *Attorney, Agent, or Firm* — Olive Law Group PLLC; Nathan P. Letts

(57) ABSTRACT

The present disclosure provides novel solid sorbents synthesized by the reaction of polyamines with polyaldehyde phosphorus dendrimer (P-dendrimer) compounds for metal sequestration. The sorbents are highly stable and exhibit desirable thermodynamics and reaction kinetics with a wide variety of metals including heavy metals and rare earth elements. The sorbents can be easily regenerated for repeated use to extract metals from an aqueous solution. The materials are stable to aqueous and organic media, as well as strong acid and bases. The sorbents maintain full capacity over many cycles of use.

21 Claims, 23 Drawing Sheets

Figure 1:
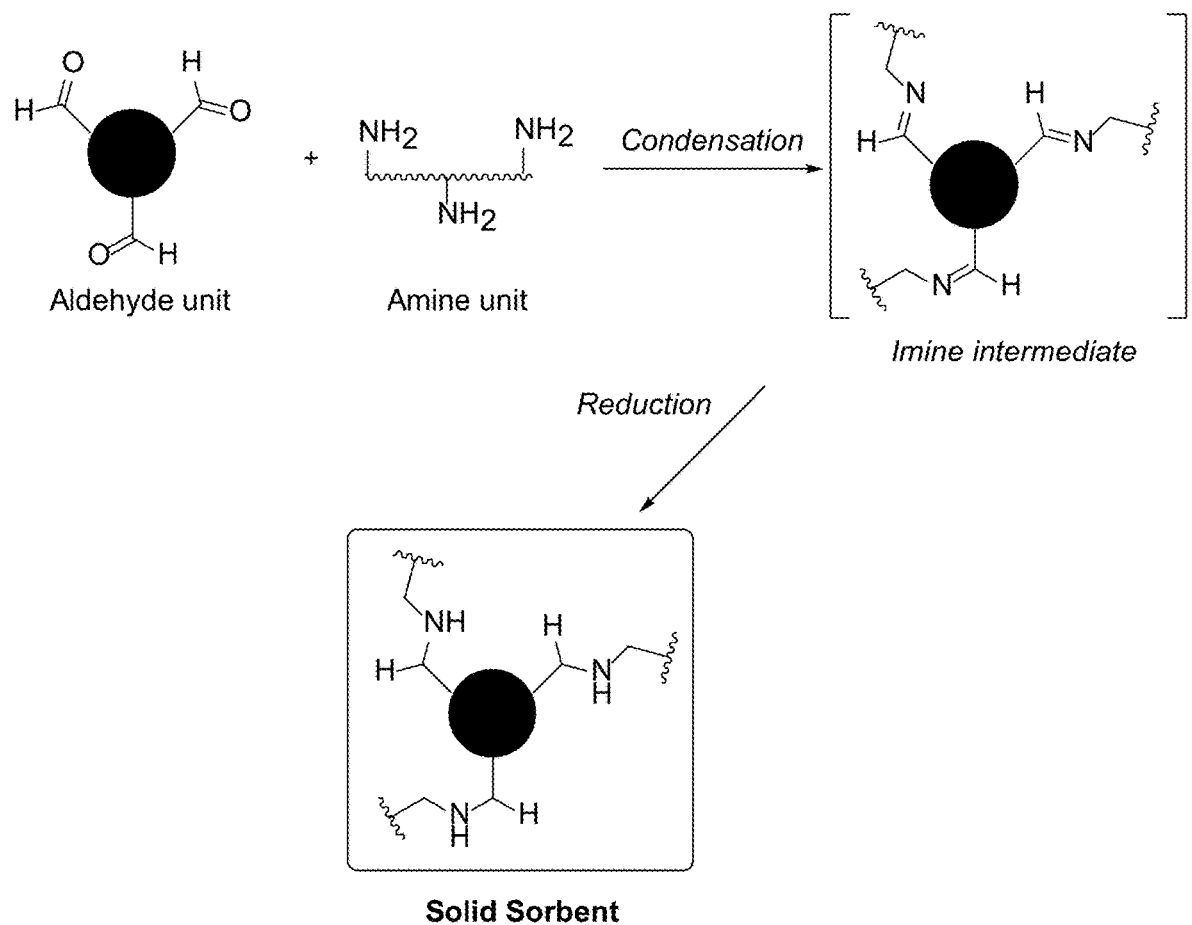

Preparation of PEI-functionalized solid sorbent with various polyaldehyde P-dendrimers.

(51) Int. Cl.
  *B01J 20/34* (2006.01)
  *C02F 1/28* (2023.01)

(56) References Cited

U.S. PATENT DOCUMENTS

| | | | |
|---|---|---|---|
| 8,500,854 | B1 | 8/2013 | Pennline et al. |
| 9,707,313 | B2 | 7/2017 | Artzi et al. |
| 10,994,261 | B2 | 5/2021 | Thompson, III et al. |
| 2004/0121122 | A1 | 6/2004 | Reynolds et al. |
| 2006/0021938 | A1 | 2/2006 | Diallo |
| 2006/0052532 | A1 | 3/2006 | Rademann |
| 2007/0106030 | A1 | 5/2007 | Caminade |
| 2010/0263534 | A1 | 10/2010 | Chuang |
| 2017/0197198 | A1 | 7/2017 | Soukri et al. |

OTHER PUBLICATIONS

Thompson et al, Energy Fuels 2018, 32, 8658-8667 (Year: 2018).*
Pawlaczyk, M., et al. Nanomaterials Modification by Dendrimers-A Review. World Journal of Research and Review (WJRR) 6(5), 14-30 (May 2018).
Sajid, M., et al. Removal of heavy metals and organic pollutants from water using dendriticpolymers based adsorbents: A critical review. Separation and Purification Technology 191, 400-423 (2018).
Thompson, S.J., et al. Phosphorous dendrimer bound polyethyleneimine as solid sorbents for postcombustion CO2 capture. Chemical Engineering Journal 350, 1056-1065 (2018).
Written Opinion dated May 14, 2020 for PCT/US2020/103855.
International Search Report dated May 14, 2020 for PCT/US2020/103855.
Heavy metals, Wikipedia accessed Oct. 15, 2021 (31 pages).
Rare-earth element, Wikipedia accessed Oct. 15, 2021 (22 pages).
Office Action dated Oct. 17, 2023 issued by Chinese Intellectual Property Administration in related Chinese Application No. 202080016303.6 (13 pages)(English translation 14 pages).
Aaron, Douglas and Tsouris, Costas. 2005. "Separation of CO2 from Flue Gas: A Review." Separation Science and Technology. vol. 40. 321-348.
An, Jihyun and Rosi, Nathaniel L. 2010. "Tuning MOF Co2 Adsorption Properties via Cation Exchange." JACS. vol. 132. 5578-5579.
Caminade & Majoral, "Which Dendrimer to Attain the Desired Properties? Focus on Phosphorhydrazone Dendrimers" Molecules 23, 622 pp. 1-12. 2016.
Dendrimer. Wikipedia. Accessed Jan. 11, 2018 (9 pages).
Drese, Jeffrey H. et al. 2009. "Synthesis-Structure-Property Relationships for Hyperbranched Aminosilica CO2 Adsorbents." Advanced Functional Materials. vol. 19. 3821-3832.
Hicks, Jason C. et al. 2008. "Designing Adsorbents for CO2 Capture from Flue Gas-Hyperbranched Aminosilicas Capable of Capturing CO2 Reversibly." JACS. vol. 130. 2902-2903 and supporting information (13 pages).
Huang, Helen Y. and Yang, Ralph T. 2003. "Amine-Grafted MCM-48 and Silica Xerogel as Superior Sorbents for Acidic Gas Removal from Natural Gas." Industrial & Engineering Chemistry Research. vol. 42. 2427-2433.
Khalilpour, Rajab et al. 2014. "Membrane-based carbon capture from flue gas: a review." Journal of Cleaner Production. vol. 103. 1-15.
Liang, Zhijian et al. 2008. "Stepwise growth of melamine-based dendrimers into mesopores and their CO2 adsorption properties." Microporous and Mesoporous Materials. vol. 111. 536-543.
Majoral, Jean-Pierre and Caminade, Anne-Marie. "What to do with Phosphorus in Dendrimer Chemistry." in New Aspects of Phosphorus Chemistry II (2003) Springer pp. 113-159.
Muhammad, Raeesh et al. 2016. "Aminal linked inorganic-organic hybrid nanoporous materials (HNMs) for CO2 capture and H2 storage applications." RSC Advances. vol. 6. 17100-17105.
Quang, Dang Viet et al. 2016. "Investigation of CO2 adsorption performance and fluidization behavior of mesoporous silica supported polyethyleneimine." Powder Technology. vol. 301. 449-462.
Riegert et al. 2013. "Diversified Strategies for the Synthesis of Bifunctional Dendrimeric Structures" European Journal of Organic Chemistry 5414-5422.
Riegert, David et al. 2016. "Silica Functionalized by Bifunctional Dendrimers: Hybrid Nanomaterials for Trapping CO2." European Journal of Inorganic Chemistry. vol. 19. 3103-3110 and Supplement (13 pages).
Sanz-Perez, Eloy S. et al. 2016. "Direct Capture of CO2 from Ambient Air." Chem. Rev. 116: 11840-11876.
Satyapal, Sunita et al. 2001. "Performance and Properties of a Solid Amine Sorbent for Carbon Dioxide Removal in Space Life Support Applications." Energy & Fuels. vol. 15. 250-255.
Songolzadeh, Mohammad et al. 2014. "Carbon Dioxide Separation from Flue Gases: A Technological Review Emphasizing Reduction in Greenhouse Gas Emissions." The Scientific World Journal. vol. 2014. 1-34.
Wang, Dongxiang et al. 2012. "Development of Carbon-Based "Molecular Basket" Sorbent for CO2 Capture." Industrial & Engineering Chemistry Research. vol. 51. 3048-3057.
Xu, Xiaochun et al. 2002. "Novel Polyethylenimine-Modified Mesoporous Molecular Sieve of MCM-41 Type as High-Capacity Adsorbent for CO2 Capture." Energy & Fuels. vol. 16. 1463-1469.
Zhang, Wenbin et al. 2014. "Capturing CO2 from ambient air using a polyethyleneimine-silica adsorbent in fluidized beds." Chemical Engineering Science. vol. 116. 306-316.

* cited by examiner

General scheme of two step one-pot reaction involving an aldehyde component and amine component

Preparation of PEI-functionalized solid sorbent with various polyaldehyde P-dendrimers.

Phosphorous Cores

Thiophosphoryl    Phosphazene    Cylophosphazatetraene

X = Cl, for preparation with nucleophiles
X = Incorporated nucleophile, for sorbent preparation

**Polyaldehyde *P*-dendrimer examples.**

Polyaldehyde *P*-dendrimer examples.

ethane-1,2-diamine propane-1,3-diamine $N^1$-(2-aminoethyl)ethane-1,2-diamine $N^1$-(3-aminopropyl)propane-1,3-diamine $N^1,N^1{}'$-(ethane-1,2-diyl)bis(ethane-1,2-diamine)

$N^1$-(2-aminoethyl)-$N^2$-(2-((2-aminoethyl)amino)ethyl)ethane-1,2-diamine $N^1,N^1$-bis(2-aminoethyl)ethane-1,2-diamine benzidine Polyethyleneimines (PEI) - branched     Molecular weight (Mw)

600

800

1200

1800

10,000

25,000 (linear)

70,000

Polyamine examples.

Solid State $^{13}$C CP/MAS spectrum of 1-G$_0$/600PEI.

Infrared spectra comparison of solid sorbent 1-$G_0$/600PEI with the starting materials (the phosphorus-based dendrimer core and 600PEI).

Thermogravimetric analysis (TGA) curves displaying the temperature effect on 1-G$_0$-TEPA sorbent capacity.

A Z-polarized confocal microscope image of 1-G$_0$/600PEI.

SEM image showing clusters of 1-G₀/600PEI (10 µm)

SEM image showing clusters of 1-G$_0$/600PEI (2.0 μm)

SEM image showing clusters of 1-G$_0$/600PEI (20.0 μm)

N₂ adsorption-desorption isotherms for 1-G₀/600PEI.

N₂ adsorption-desorption isotherms for 1-G₀/600PEI.

Adsorption kinetics of sorbent removal of Hg and Pb at 50 ppm concentration with 1 g/L or 5 g/L sorbent loading.

Effect of pH on 50 ppm Hg and Pb removal from 5 g/L sorbent treatment.

Treatment of mixed metal ion solution with solid sorbent.

Flow-through adsorption and regeneration of the solid sorbent.

Visual sorbent change from adsorption to regeneration with Cu.

Flow-through Column Testing (13.3 mL/min)

50 mg/L aq. Hg 30 min testing period      99% Hg removed

Chromatographic separation of Hg(II) by solid sorbent.

Characterization of Fe(III) supported *P*-dendrimer solid sorbent for As removal with FT-IR and 1SEM.

Removal of As(II) and As(IV) from modeled ground water solution with the solid sorbent and Fe(III) oxide functionalized solid sorbent.

Sorbent loading effect on As removal.

Kinetics for As removal with the solid sorbent.

pH Effect on As removal with the solid sorbent.

Batch Removal of selenite, Se(IV), and selenate, Se(VI), with the iron-functionalized solid sorbent.

POLYAMINE PHOSPHORUS DENDRIMER MATERIALS FOR METAL SEQUESTRATION

CROSS REFERENCE TO RELATED APPLICATIONS

This application is a § 371 U.S. National Stage of International Application PCT/US2020/013855, filed Jan. 16, 2020, which claims the benefit of 62/793,644 filed 17 Jan. 2019, Thompson & Soukri, which are hereby incorporated by reference in their entireties.

STATEMENT REGARDING FEDERALLY SPONSORED RESEARCH OR DEVELOPMENT

This invention was made with government support under DE-FE0026432 awarded by the U.S. Department of Energy. The government has certain rights in the invention.

1. FIELD

The present disclosure provides novel solid sorbents synthesized by the reaction of polyamines with polyaldehyde phosphorus dendrimer (P-dendrimer) compounds for metal sequestration. The sorbents are highly stable and exhibit desirable thermodynamics and reaction kinetics with a wide variety of metals including heavy metals and rare earth elements. The sorbents can be easily regenerated for repeated use to extract metals from an aqueous solution. The materials are stable to aqueous and organic media, as well as strong acid and bases. The sorbents maintain full capacity over many cycles of use.

2. BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

2.1. Introduction: Heavy Metal Removal

The contamination of water sources by heavy metals (e.g. Pb, Hg, As, etc.) stemming from industrial pollution or natural occurrence can have devastating effects on the environment and poses a significant threat to human health. Industrial waste discharges contain heavy metals, which are highly water-soluble, that enter aquatic streams leading to absorptive build up in cultivated soils, and present technical challenges for removal to preserve drinking water quality. Long-term exposure to heavy metals or ingestion beyond permitted concentrations can lead to serious human health disorders or even death. World-wide regulatory efforts have been established to limit the exposure of humans to dangerous heavy metals and the effective reduction in concentration of the metals to trace levels (<5 ppb) remains a significant challenge to-date.[1]

Three of the most highly toxic water-contaminating elements are lead (Pb), mercury (Hg), and arsenic (As). These metals cause various adverse health effects at low exposure levels, with significant risk for death at high ingestion levels and causing cancer from long term exposure. The current regulatory limits of the U.S. environmental protection agency (EPA) for lead (Pb), mercury (Hg), and arsenic (As) are 15 ppb, 2 ppb, and 10 ppb respectively. Heavy metals commonly enter drinking water supplies from the erosion and dissolution of natural deposits, as well as from agricultural and industrial waste water. Lead specifically poses a challenge for drinking water when pipes that contain lead corrode, which is prevalent in water supplies with high acidity or low mineral content. Due to strict human exposure standards, extremely efficient and cost-effective technologies are required to purify water supplies before mass consumption.

Various technologies have been developed to remove contaminating heavy metals from water streams, including precipitation, coagulation, reverse osmosis, ion exchange, solvent extraction, flotation, and membrane separation. These processes typically face economic and technical hurdles, such as low capacities and low removal rates which prevent their implementation due to low-energy process requirements and the necessary avoidance of toxic sludge.[2] Adsorption technologies have emerged as attractive alternatives due to low cost, simplistic process designs with strong metal binding affinities and high removal rates.[3] Solid sorbents that do not mix with waste water but can remove toxic and harmful impurities are greatly sought after. The adsorbent technologies have been based off zeolite, activated carbon, silica, polymers, biomaterials, ion exchange resins, industrial byproducts, biomass, and biological materials.[4] Of the class of adsorbent technologies, those that bind heavy metals via the chelation effect offer a cheap and environmentally friendly technique that has minimized technical limitations.[5]

In the polymer class of adsorbents, dendritic polymers have gained significant attention in water purification applications. Dendrimers are well-defined, step-wise constructed polymers that have many reactive end groups. These macromolecules have a well-defined structure that can be finely tuned through the precise addition of specific monomers. The ease of diversification and functionalization with a variety of end groups has made dendritic materials promising candidates for heavy metal removal from polluted water sources. Dendrimers are well suited adsorbents due to their three-dimensional structure providing both external and internal binding sites, strong chelation effects from a larger number reactive sites, and tunability to specifically target various contaminants.[6] The most widely studied and applied dendritic polymer is the poly(amidoamine) (PAMAM) dendrimer, which consists of ethylenediamine and methylacrylate repeating units. The PAMAM dendrimer is non-toxic, low cost, easily synthesized, and shows high affinities towards heavy metals.[7] The amine-functionalized dendrimers remove heavy metals through strong chelation effects by the various amine units of the polymer.

Typically, dendrimers, such as PAMAM, must be supported or integrated with other inorganic or organic materials to enhance the mechanical strength, to form a solid material, and to increase the available surface area for heavy metal removal. The most common supports are silica and carbon-based, however titania, magnetic nanoparticles, cellulose, chitin, and membranes have also been demonstrated. The supported dendrimers have shown capabilities to remove a wide range of heavy metals (Pb(II), Cd(II), Cu(II), Mn(II), Ni(II), Hg(II), etc.). The support of the dendrimers inevitably decreases the overall chelator content in the final material, due to the dilution (by weight) of the dendrimer onto the sorbent. Amine-functionalized dendrimers typically operate under narrow pH ranges (4.0-7.0) with nominal adsorption capacities (<50 mg/g), with a few exceptions reaching over >500 mg/g.[6] Likewise, the regeneration and stability of dendritic materials has not been thoroughly explored.

2.2. Introduction: Rare Earth Element Recovery

Rare earth elements (REEs), which consist mainly of the lanthanide (Ln) metals along with scandium (Sc) and yttrium (Y), are chemically similar elements that have unique properties that have made REEs vital for developing technologies. Specifically, the REEs are highly desired based on a steadily increasing demand in the energy, electronics, and defense industries, but also because of instability of the supply market. In 2015, the U.S. Geological Society estimated that global REE reserves totaled 130,000,000 tons, and the main REE reserves are controlled mainly by China (42%) and Brazil (17%), with only 1.3% owned by the U.S. As of 2012, China controlled 95% of the global REE market.[22] The lack of a stable U.S. supply chain and concerns not only of environmental and social concerns by which REEs are mined, but of national security due to foreign REE dependence has prompted significant efforts to develop new technologies to recover and recycle REEs.[23]

Recovering REEs from water bodies in the U.S. is too large of a challenge. A report from Noack et al. in 2014 found REE concentrations ranging between 5-170 pmol/L from ocean, groundwater, river, and lakes.[24] REE concentrations were found to be dramatically increased when measured from acidic water sources and acidic soils.[24,25] Recently, acid mine drainage (AMD) sludges, which are inherently highly acidic, have been found to contain significant concentrations of REEs. REEs have been detected from coal mining AMD in concentrations of 300 to over 3,000 m/L, which is a remarkably high concentration, allowing for this waste stream to be a potential source for REE recovery.[26-28] The AMD liquid stream is complex, containing a variety of other metal contaminants alongside the REE mixture making extraction of mixed or pure REE components challenging.

The most common industrial separation technologies use multistage liquid-liquid extraction (LLE) and resin-based chromatography.[29] The LLE processes utilize large volumes of organic solvents for repetitive extractions to obtain a partial selective REE concentrated solution while generating a large volume of organic waste. The resin-based chromatographic process can overcome selectivity challenges, however, the costs of the ion-exchange resins is too high due to their inability to be regenerated. Emerging technologies for REE extraction utilize chemical precipitation, membrane separation, and adsorption. Of these approaches, the adsorption process minimizes solvent waste while also improving separation efficiencies between REEs and other co-contaminants.[30] The absorbents are typically functionalized with Lewis basic compounds so that they have a strong interaction with the highly Lewis acidic REEs. For example, adsorbents such as monmorillonite and bentonite display poor REE adsorption efficiency, however, when modified with chelating agents their adsorption efficiency was greatly enhanced.[31-33] The most common Lewis basic chelating agents employed for REE capture are carboxylate and amine moieties.

The two main types of solid-phase adsorbents are based on Lewis basic functionalities anchored to solid support materials (e.g. silica) covalently or in the chemical composition of polymeric materials. The first example of using amine-functionalized silica supports was reported by Florek et al. in 2014, in which they prepared a diglycolamide-modified KIT-6 silica to extract and separate lanthanides.[34] In 2015, Zheng et al. prepared maleic anhydride functionalized mesoporous silicas for REE capture, with specifically high activity for $Eu^{3+}$ and $Gd^{3+}$.[35] Recognizing the role of the Lewis base's geometry for REE capture, Hu et al. prepared phthaloyl diamide functionalized KIT-6 silicas for targeted REE adsorption with a maximum capacity of 8.47 mg/g adsorption capacity.[29] Hybrid silica-amine-polymer matrix materials was prepared by Wilfong et al. in 2017, which displayed high ppm and ppb REE adsorption efficiencies.[36,37] Although silica materials are highly effective, the grafting materials tend to be costly and scaling the grafting process is technically challenging.

Polymeric REE adsorptive materials were first prepared by Gao et al. in 2015 using immobilized gel particles derived from poly-γ-glutamic acid (PGA) crosslinked with polyvinyl alcohol (PVA) to remove lanthanides and $Ce^{3+}$.[38] The PGA-PVA polymers were capable of adsorbing all the lanthanides from a mixture at 10 mg/L dosages with 0.2 g/L sorbent loadings. A variety of other cross-linked polymer materials have been prepared for REE adsorption.[39-44] One of the most promising polymer sorbents adsorbed 384 mg/g $La^{3+}$ within 30 minutes of exposure.[42] The benefits of polymeric materials is derived from the high loading of chelating agents that can be incorporated into the polymer material. This allows for the material to adsorb higher concentrations of REEs from solution.

3. SUMMARY OF THE DISCLOSURE

The present disclosure provides a method of removing a metal from an aqueous fluid stream which comprises contacting an aqueous fluid stream with a polyamine phosphorus dendrimer (P-dendrimer) having the formula I

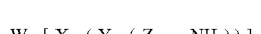

I wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine having a Mw ranging from 400 to about 1,000,000, or a polypropyleneimine; j and k are numerical values corresponding to the branch point multiplicity and whose values independently range from 1 to 10; and l is a numerical value corresponding to the branch point multiplicity and whose values ranges from 2 to 10.

The disclosure also provides a method of adsorbing, separating, storing or sequestering a metal from an aqueous fluid stream, comprising contacting the aqueous fluid stream with a polyamine phosphorus dendrimer (P-dendrimer) having the formula I

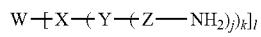

I wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine, or a polypropyleneimine; j and k are numerical values corresponding to the branch point multiplicity and whose values independently range from 1 to 10; and l is a numerical value corresponding to the branch point multiplicity and whose values ranges from 2 to 10; so as to adsorb, separate, store or sequester the metal from the aqueous fluid stream.

The disclosure also provides a process for the capture and removal of metals from an aqueous metal-containing stream the process comprising: (a) providing a housing having dispersed therein a sorbent comprising a polyamine phosphorus dendrimer (P-dendrimer) having the formula I

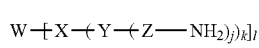

I wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine having a Mw ranging from 400 to about 1,000,000, or a polypropyleneimine; j and k are numerical values corresponding to the branch point multiplicity and whose values independently range from 1 to 10; and l is a numerical value corresponding to the branch point multiplicity and whose values ranges from 2 to 10; (b) passing a metal-containing stream through the housing such that the metal-containing stream contacts the sorbent; (c) flushing the housing with a concentrated acidic stream to cause the sorbent to desorb a metal-retained therein and form a desorbed metal solution; and (d) flushing the housing to remove the desorbed metal from the housing.

The disclosure also provides a sorbent comprising a sorbent comprising (a) iron II or iron III and (b) a polyamine phosphorus dendrimer (P-dendrimer) having the formula I

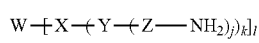

I wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine having a Mw ranging from 400 to about 1,000,000, or a polypropyleneimine; j and k are numerical values corresponding to the branch point multiplicity and whose values independently range from 1 to 10; and l is a numerical value corresponding to the branch point multiplicity and whose values ranges from 2 to 10.

4. BRIEF DESCRIPTION OF THE FIGURES

FIG. 1. General scheme of two step one-pot reaction involving an aldehyde component and amine component to form the solid sorbent through reductive amination conditions.

Figure 2:
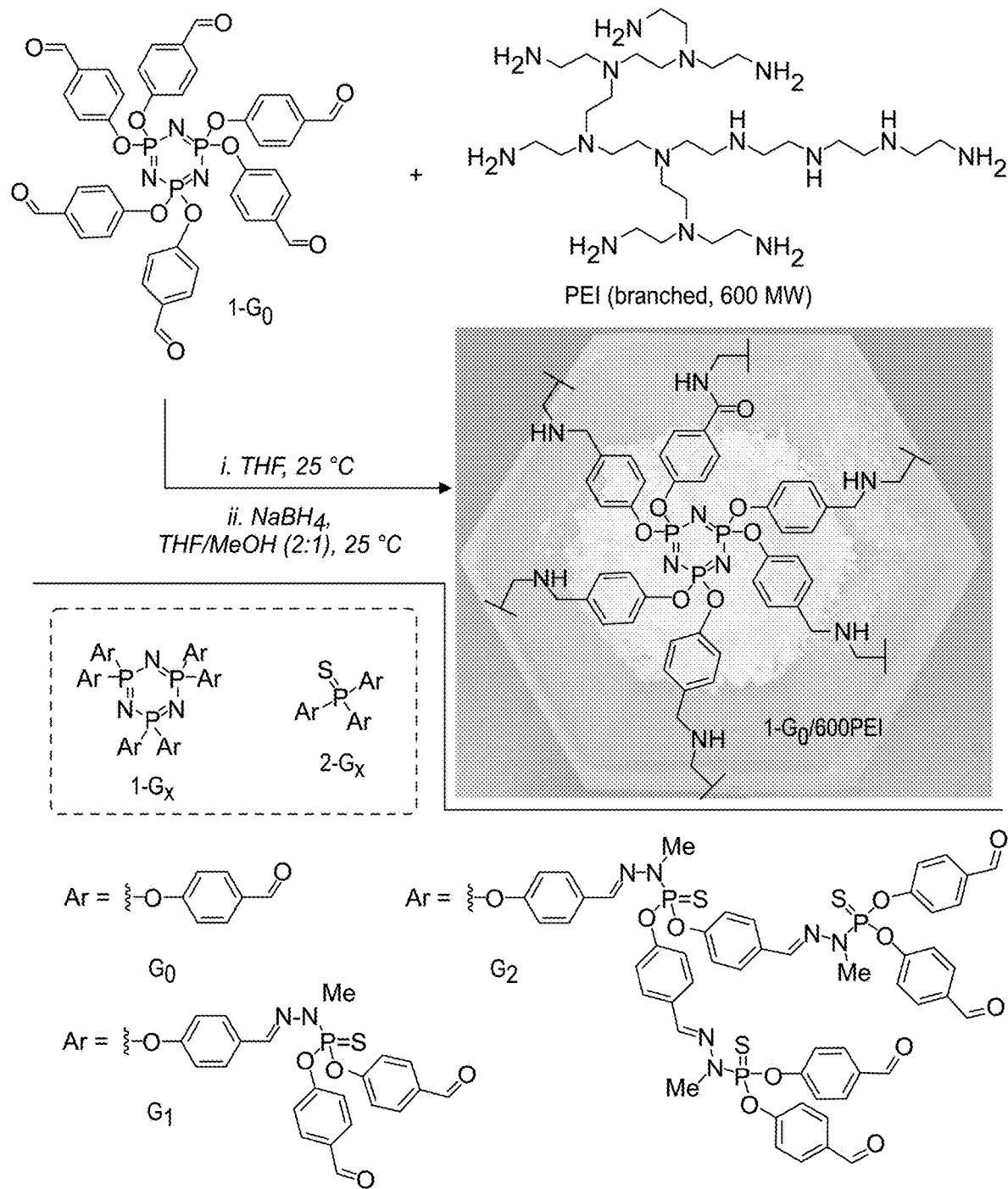

FIG. 2. Preparation of PEI-functionalized solid sorbent with various polyaldehyde P-dendrimers.

Figure 3A:
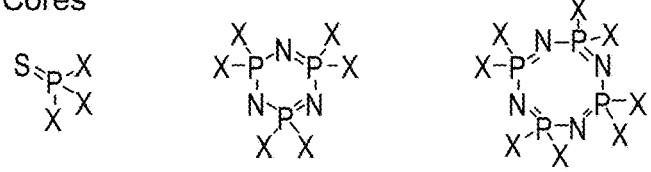
Figure 3A:
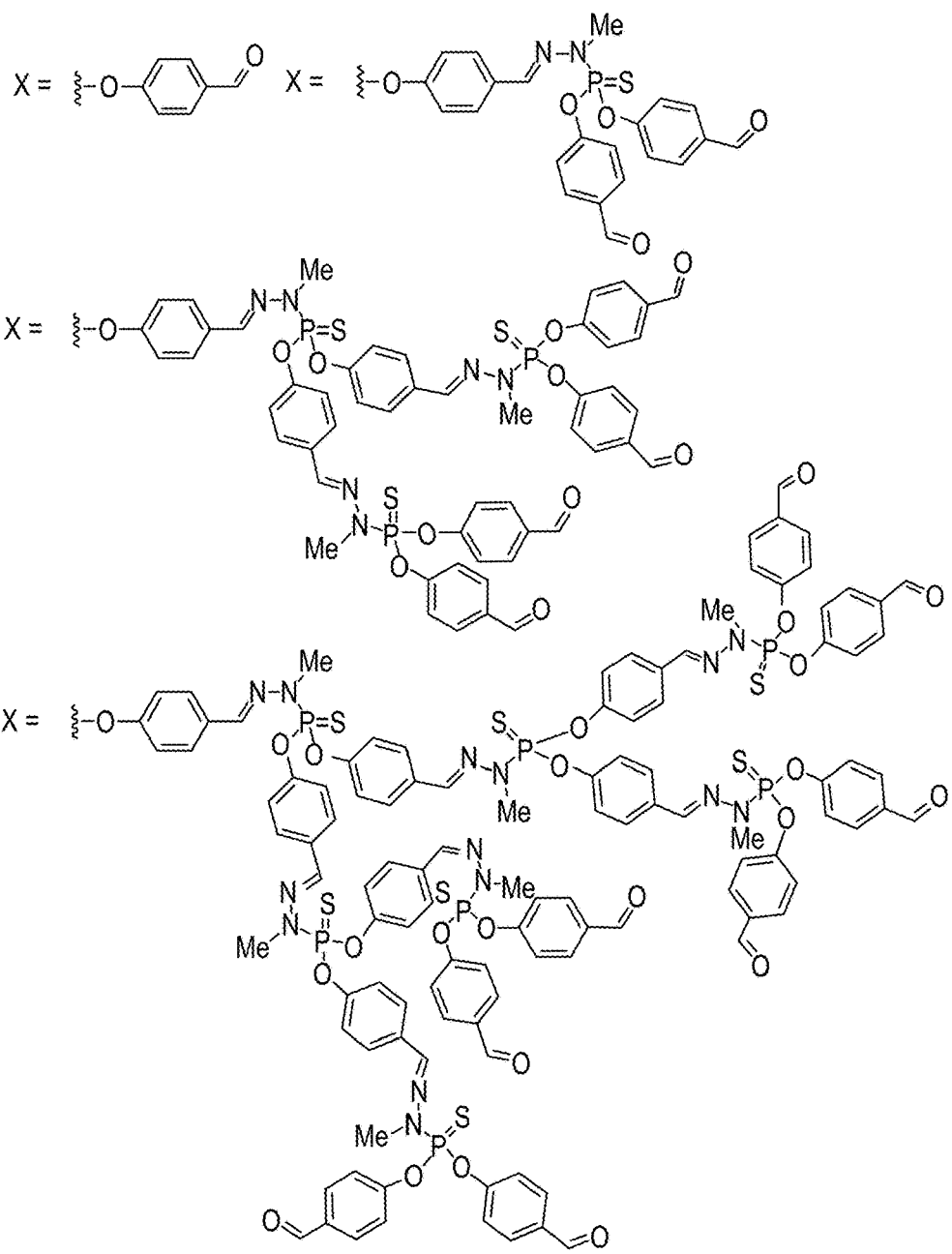
Figure 3B:
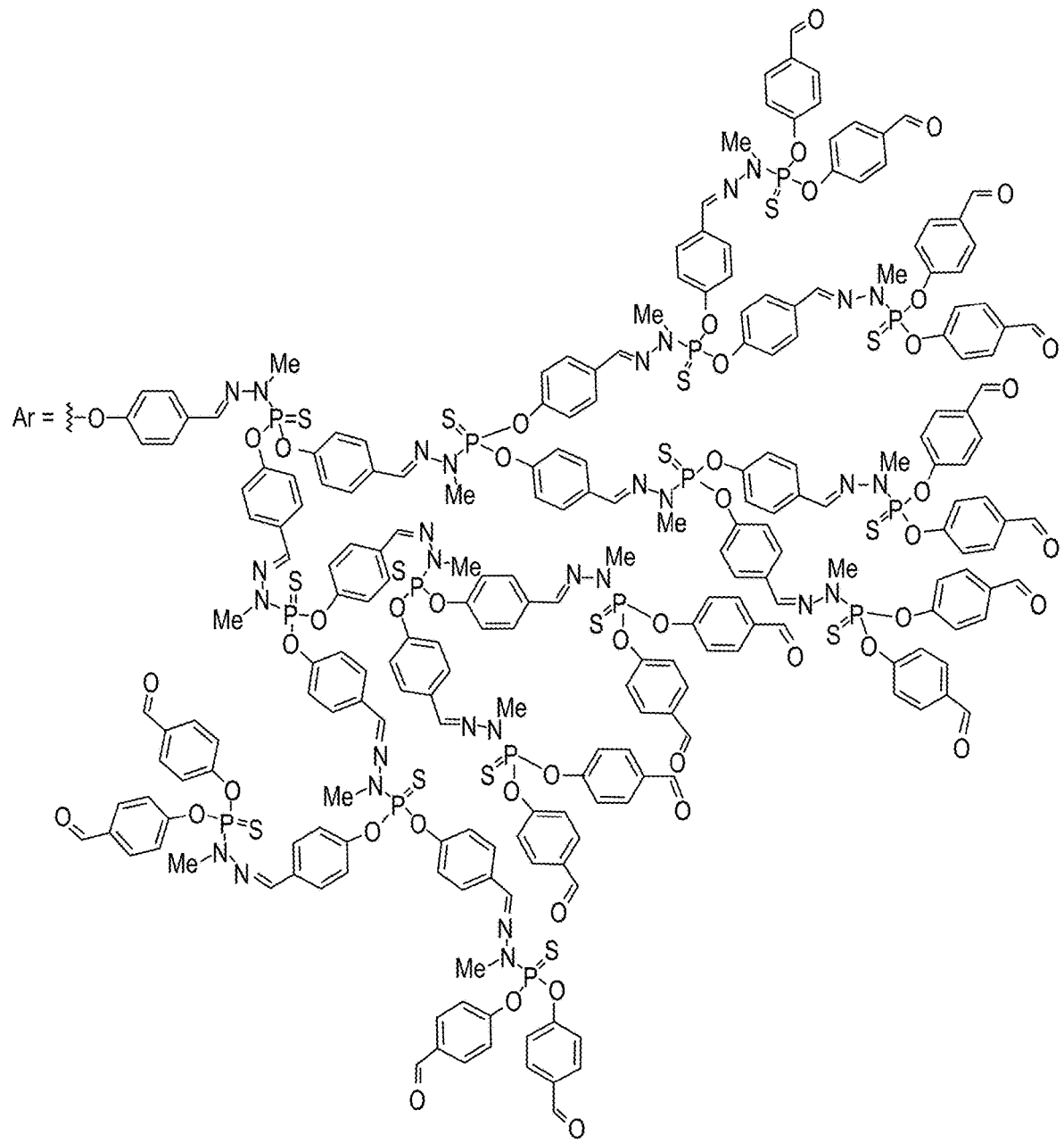

FIG. 3. Polyaldehyde P-dendrimer examples.

Figure 4:
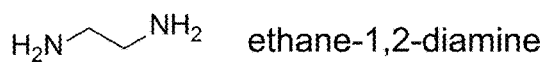
Figure 4:
Figure 4:
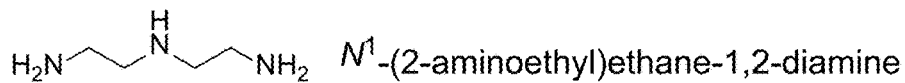
Figure 4:
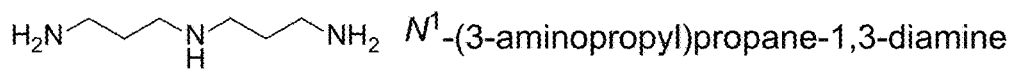
Figure 4:
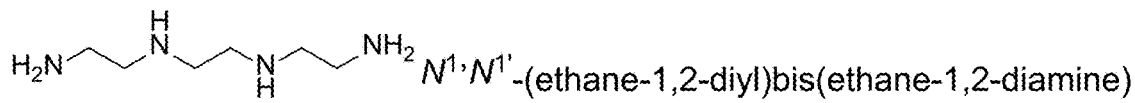
Figure 4:
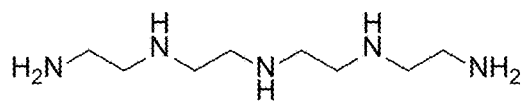
Figure 4:
Figure 4:
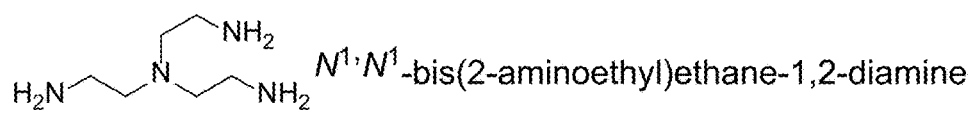
Figure 4:
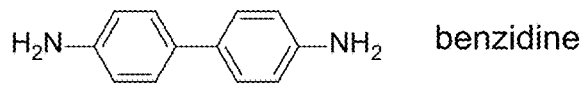

FIG. 4. Polyamine examples.

Figure 5:
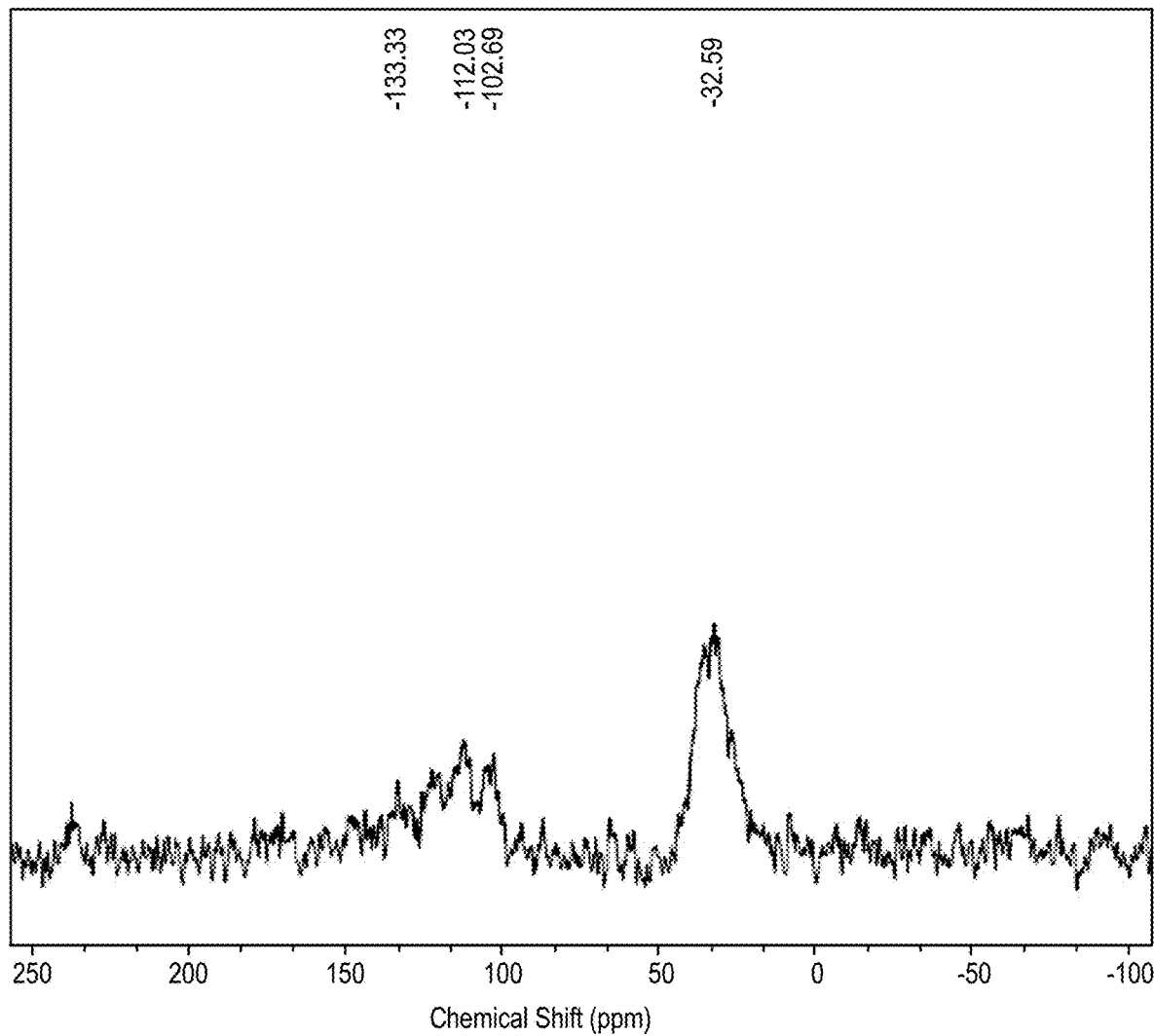

FIG. 5. Solid State $^{13}C$ CP/MAS spectrum of 1-$G_0$/600PEI.

Figure 6:
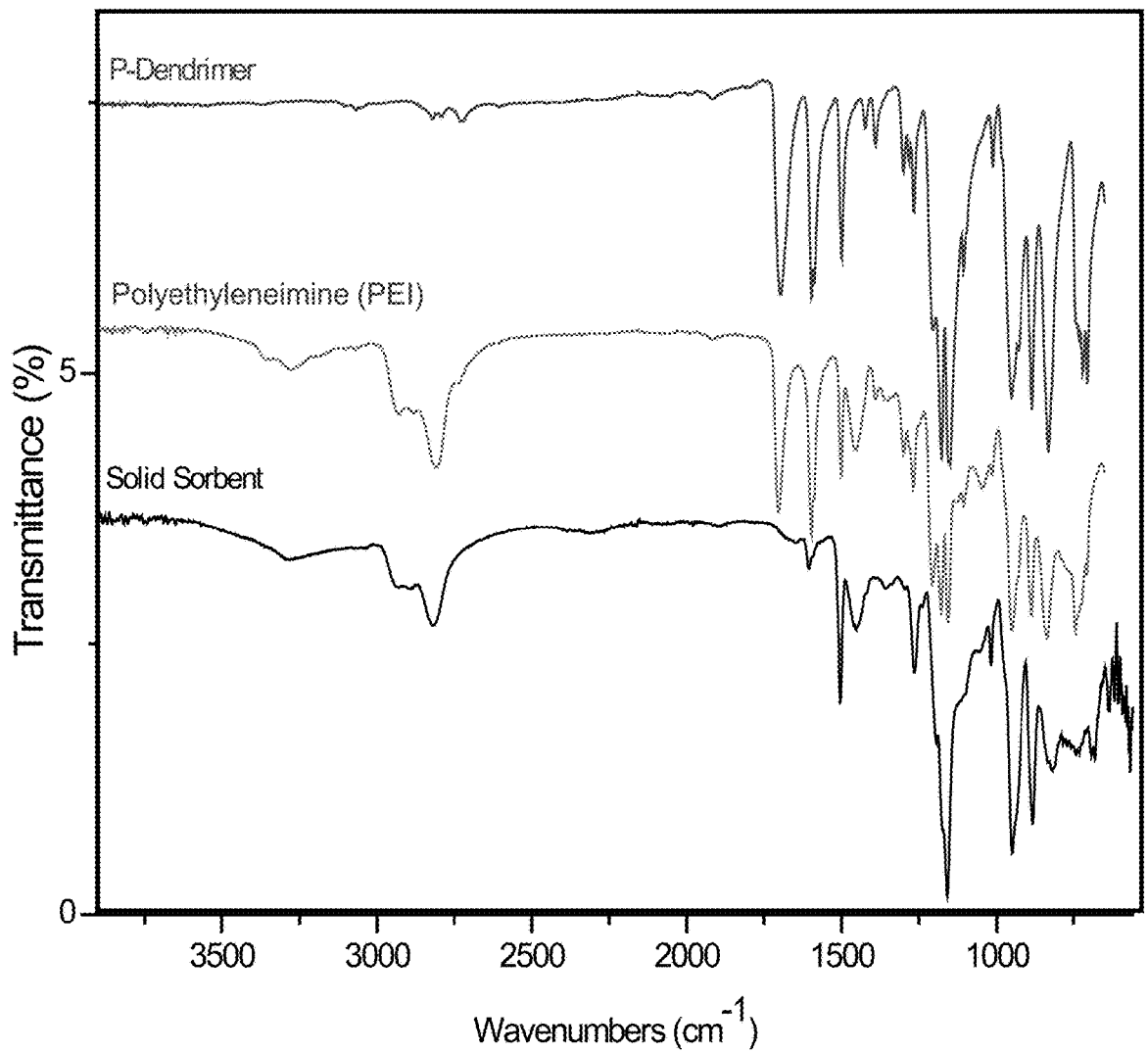

FIG. 6. Infrared spectra comparison of solid sorbent 1-$G_0$/600PEI with the starting materials (the phosphorus-based dendrimer core and 600PEI).

Figure 7:
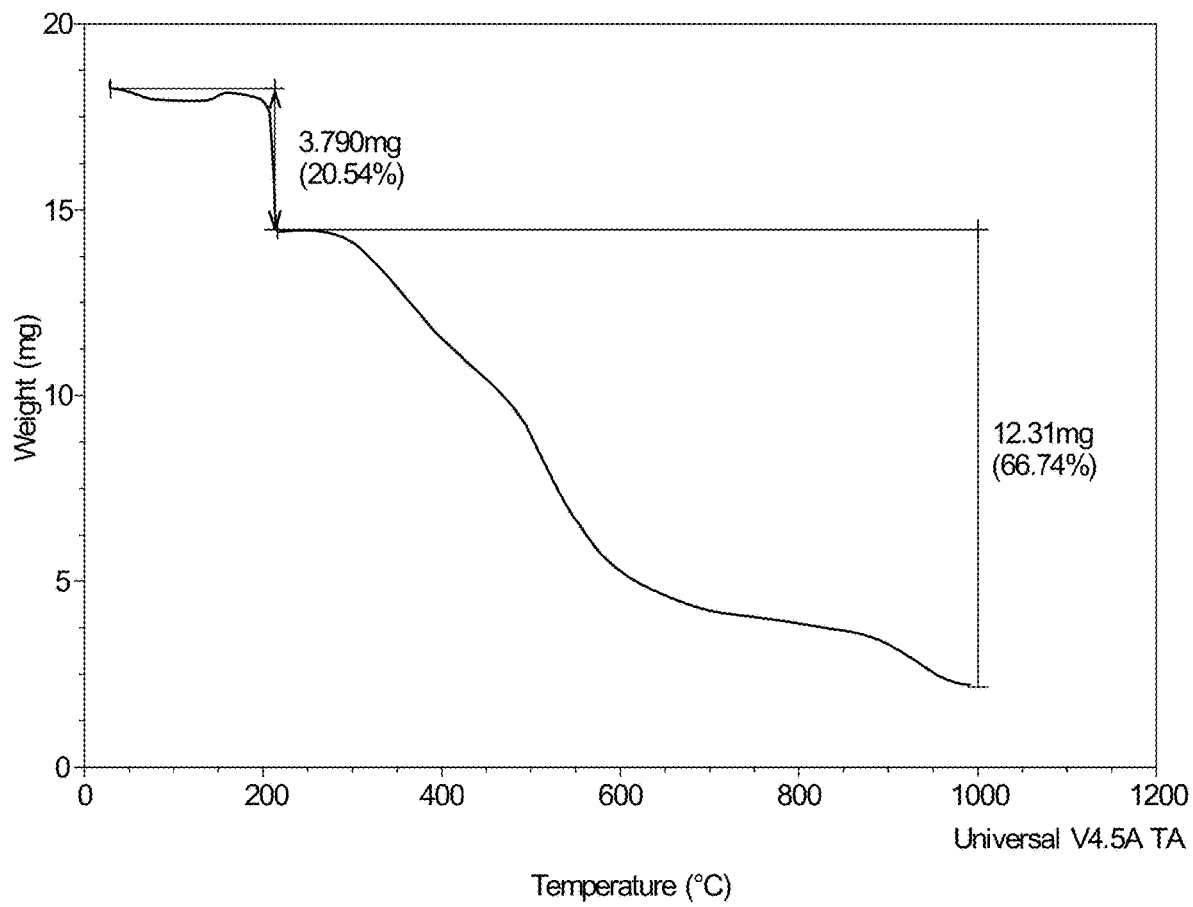

FIG. 7. Thermogravimetric analysis (TGA) curves displaying the temperature effect on 1-$G_0$-TEPA sorbent capacity.

Figure 8:
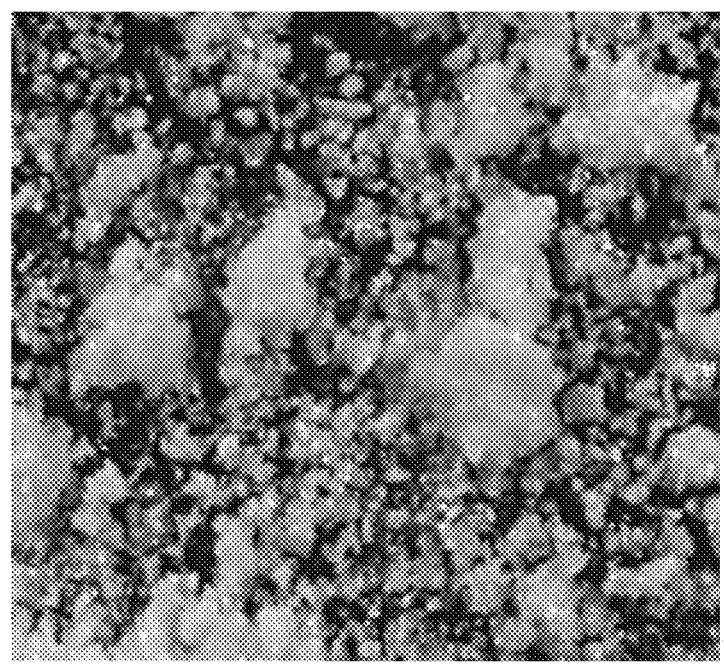

FIG. 8. Z-polarized confocal microscope image of 1-$G_0$/600PEI.

Figure 9A:
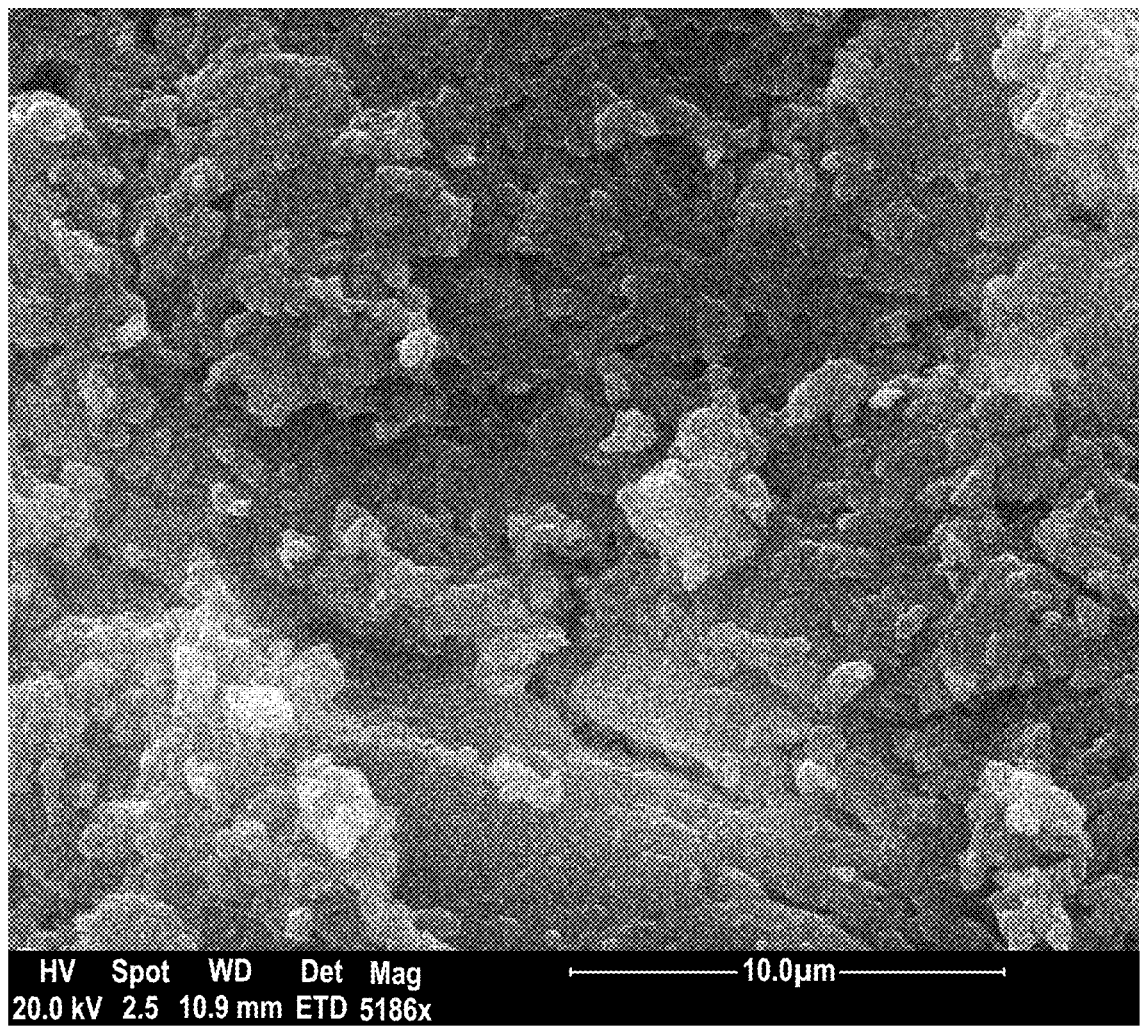
Figure 9B:
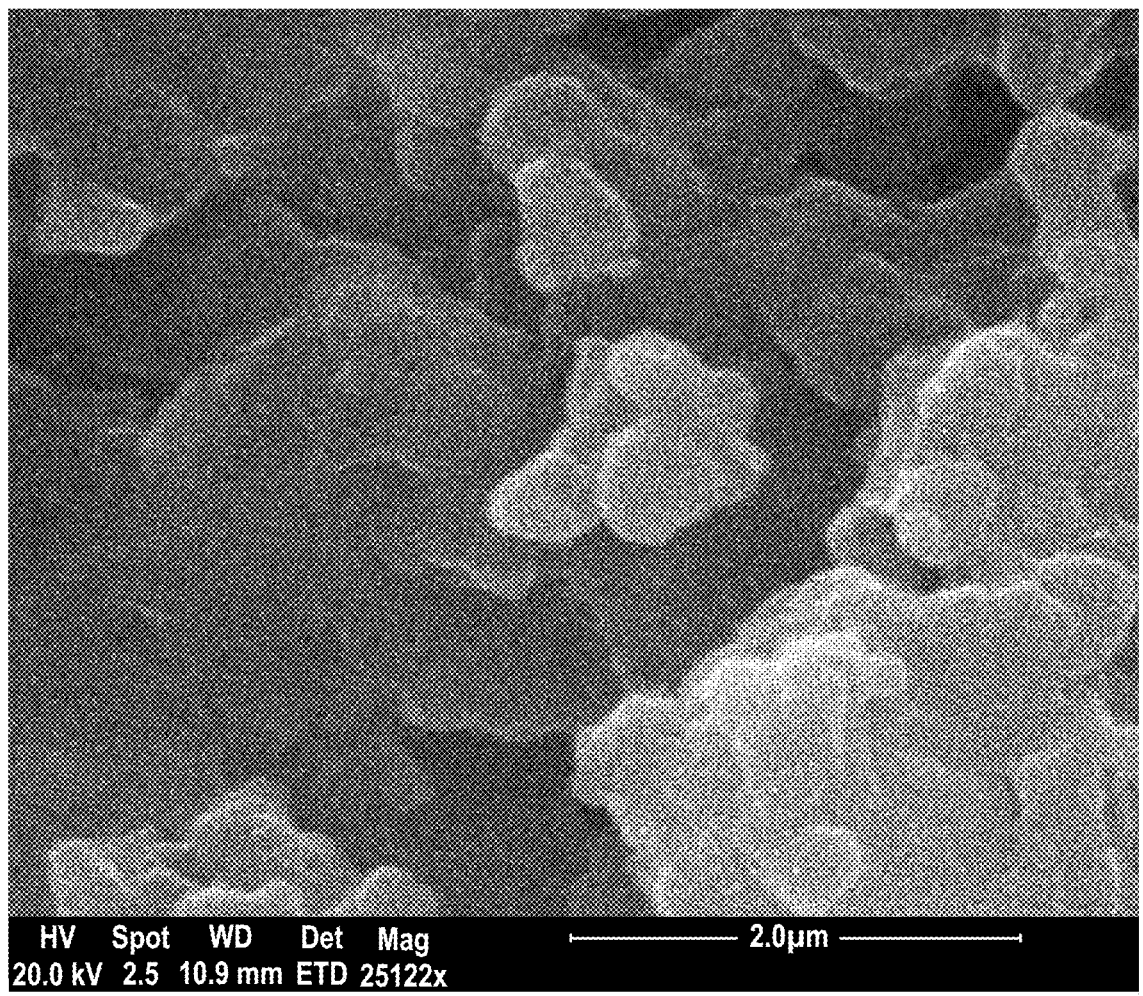
Figure 9C:
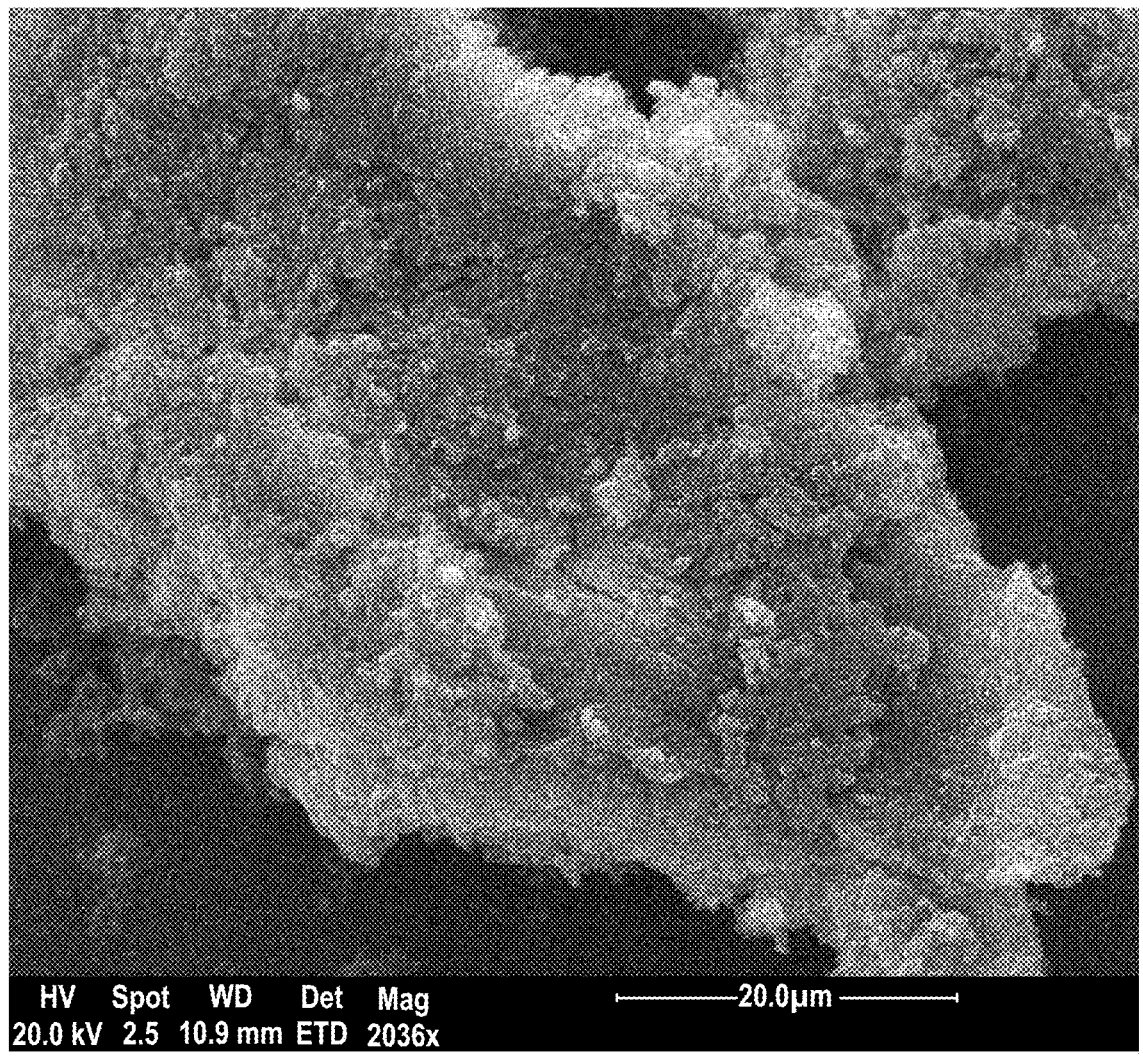

FIG. 9A-9C. SEM images showing clusters of 1-$G_0$/600PEI. FIG. 9A 1-$G_0$/600PEI (10 µm), FIG. 9B 1-$G_0$/600PEI (20 µm), and FIG. 9C 1-$G_0$/600PEI (2.0 µm).

Figure 10:
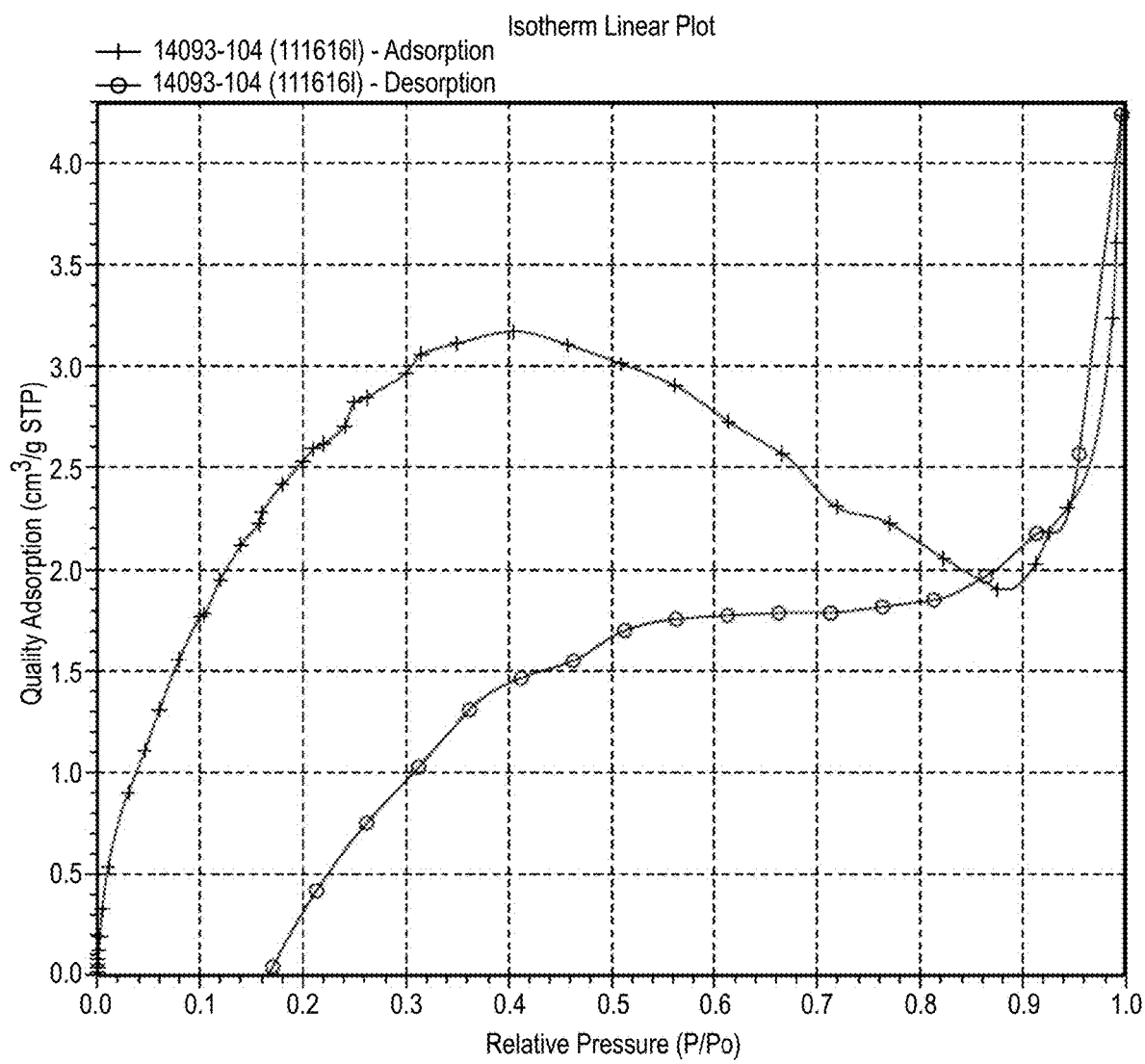
Figure 10:
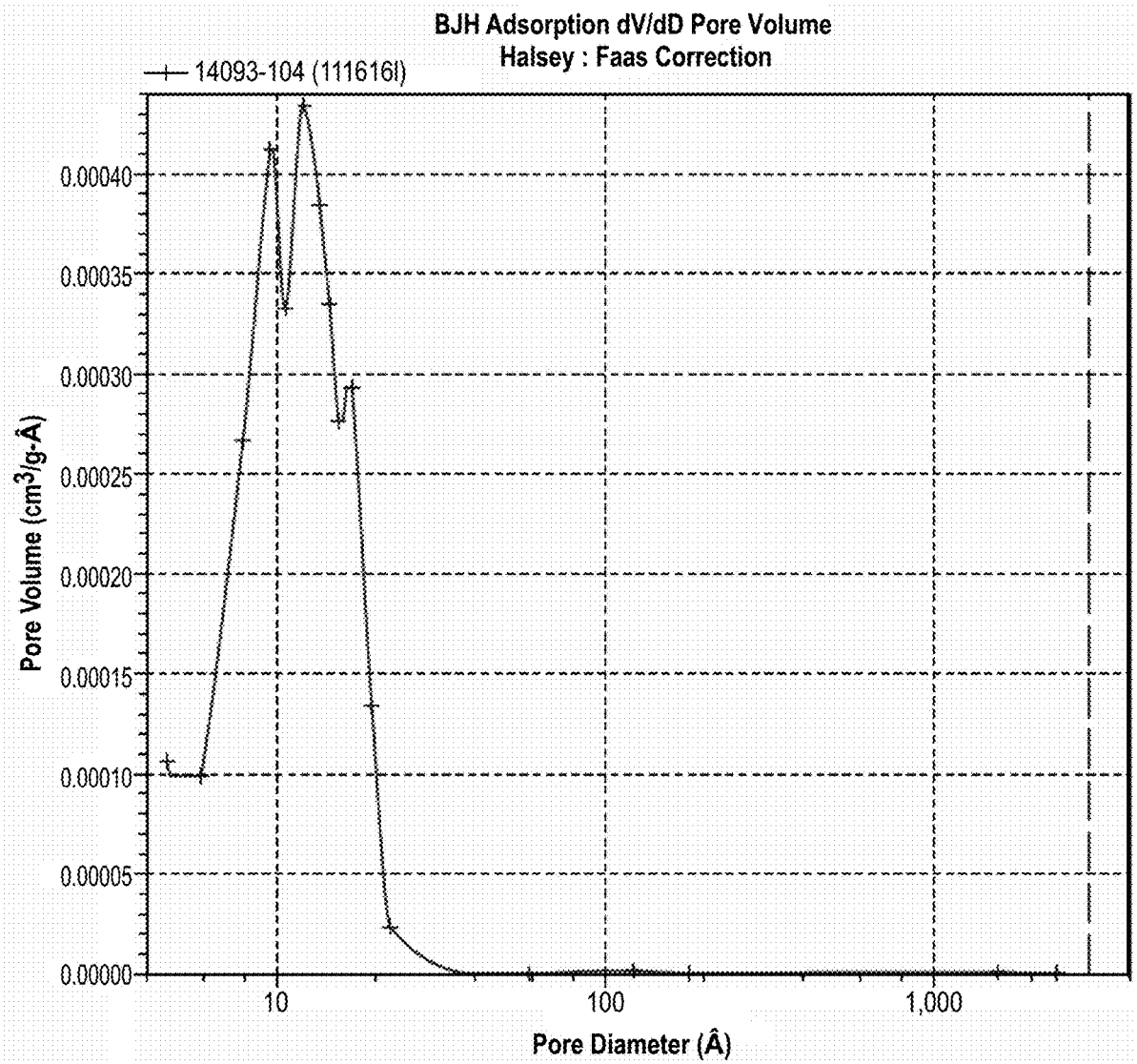

FIG. 10. $N_2$ adsorption-desorption isotherms for 1-$G_0$/600PEI.

Figure 11A:
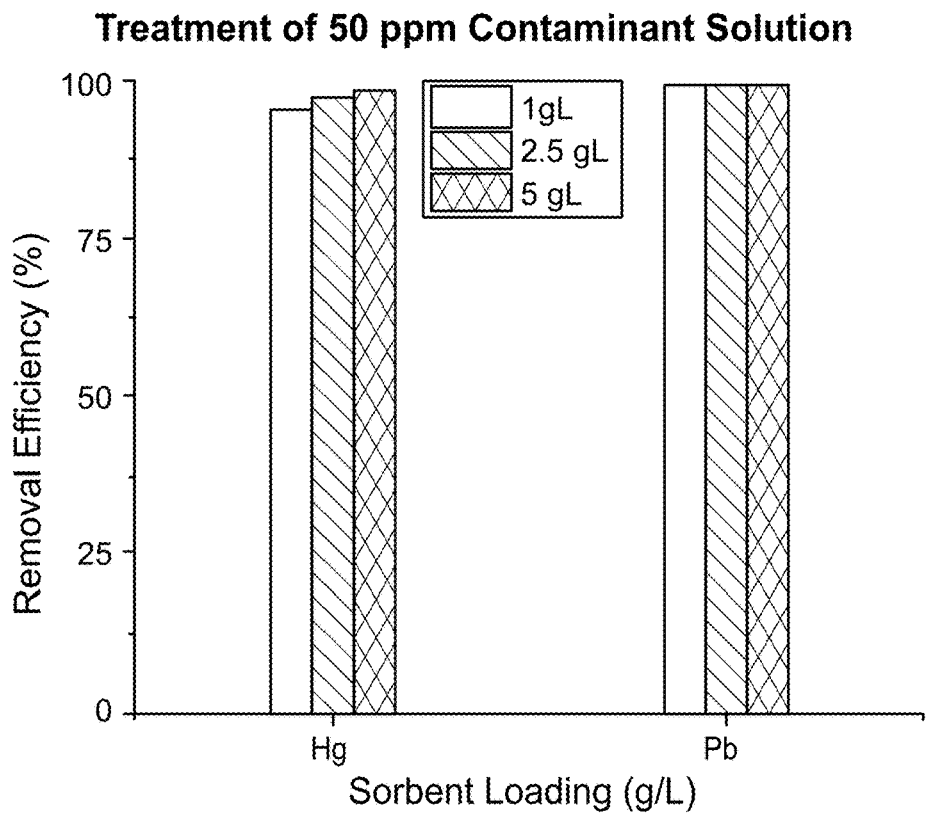
Figure 11B:
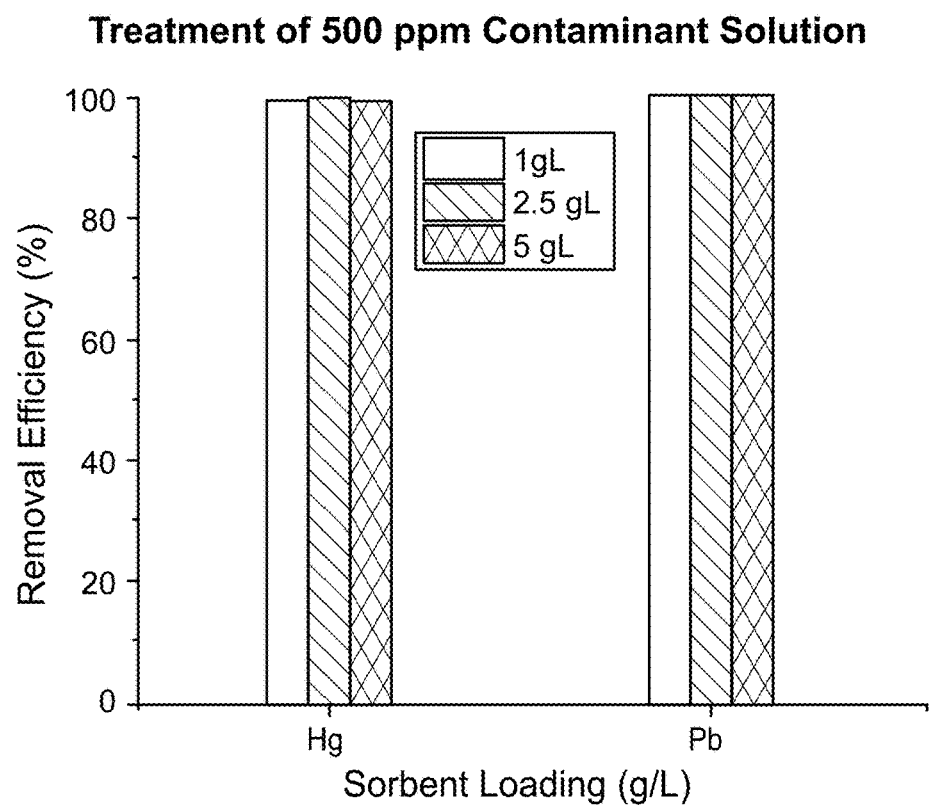

FIGS. 11A and 11B. Sorbent treatment of Hg and Pb at 11A) 50 ppm and 11B) 500 ppm concentrations.

Figure 12A:
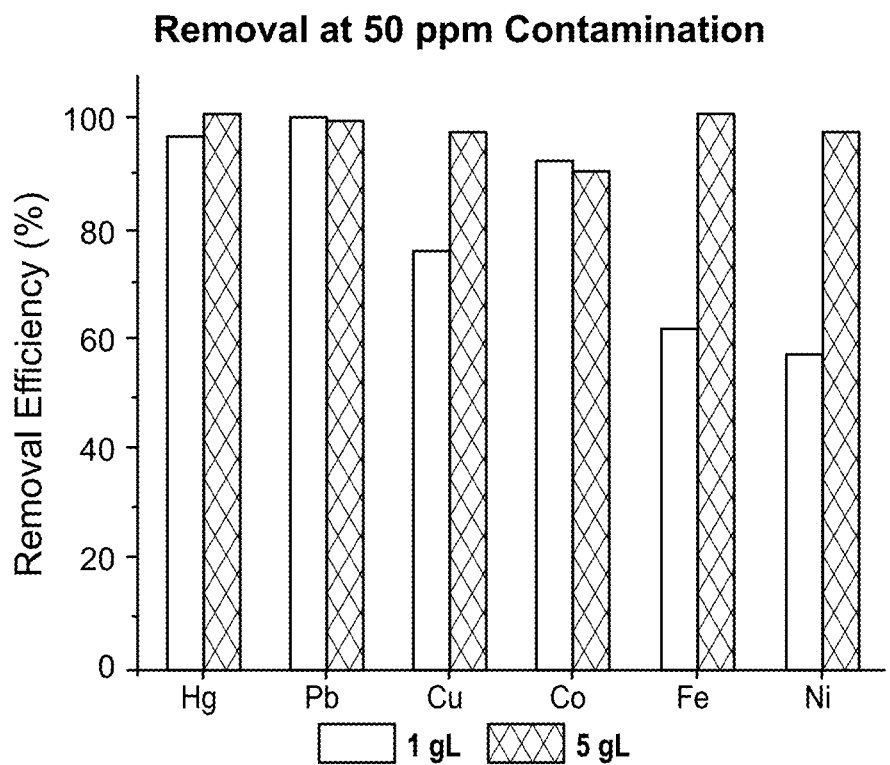
Figure 12B:
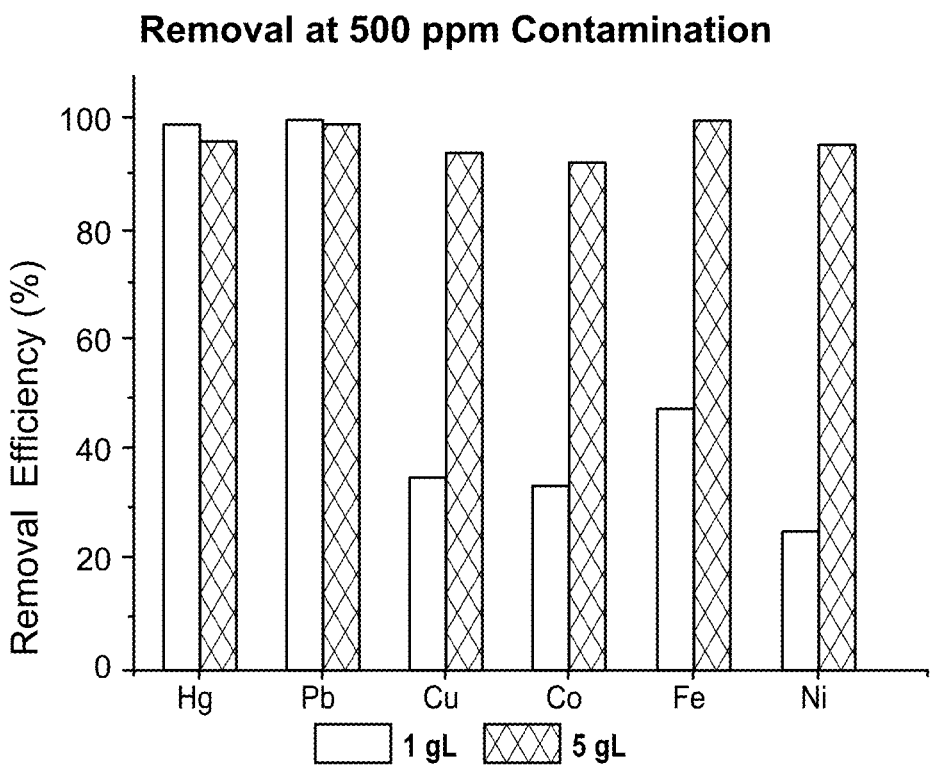

FIGS. 12A-12B. Sorbent treatment of various heavy metals at 12A) 50 ppm and 12B) 500 ppm concentrations.

Figure 13:
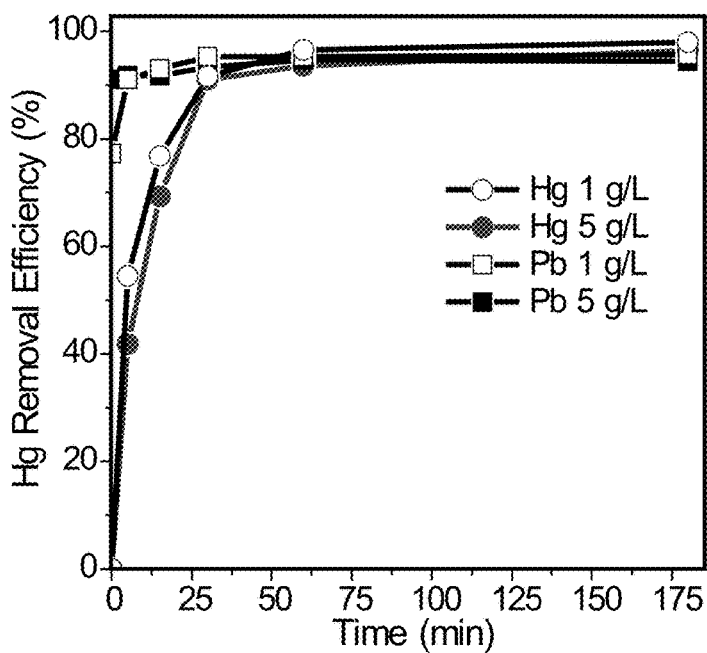

FIG. 13. Adsorption kinetics of sorbent removal of Hg and Pb at 50 ppm concentration with 1 g/L or 5 g/L sorbent loading.

Figure 14:
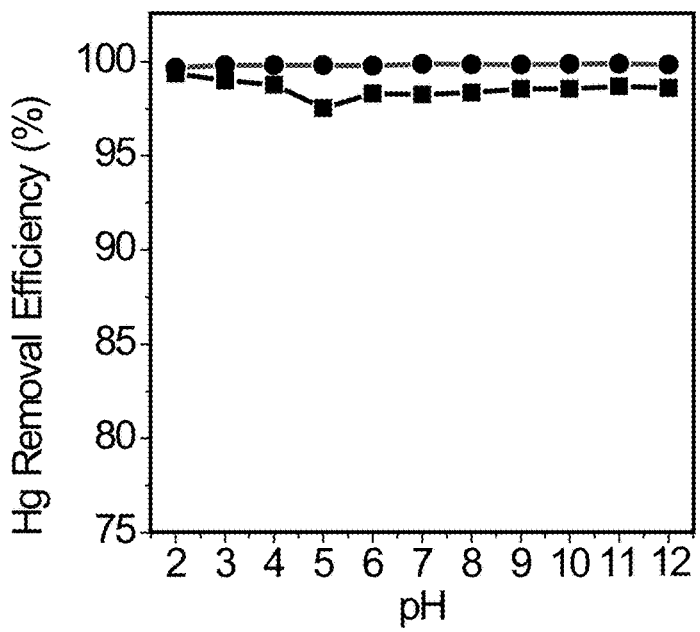

FIG. 14. Effect of pH on 50 ppm Hg and Pb removal from 5 g/L sorbent treatment.

Figure 15:
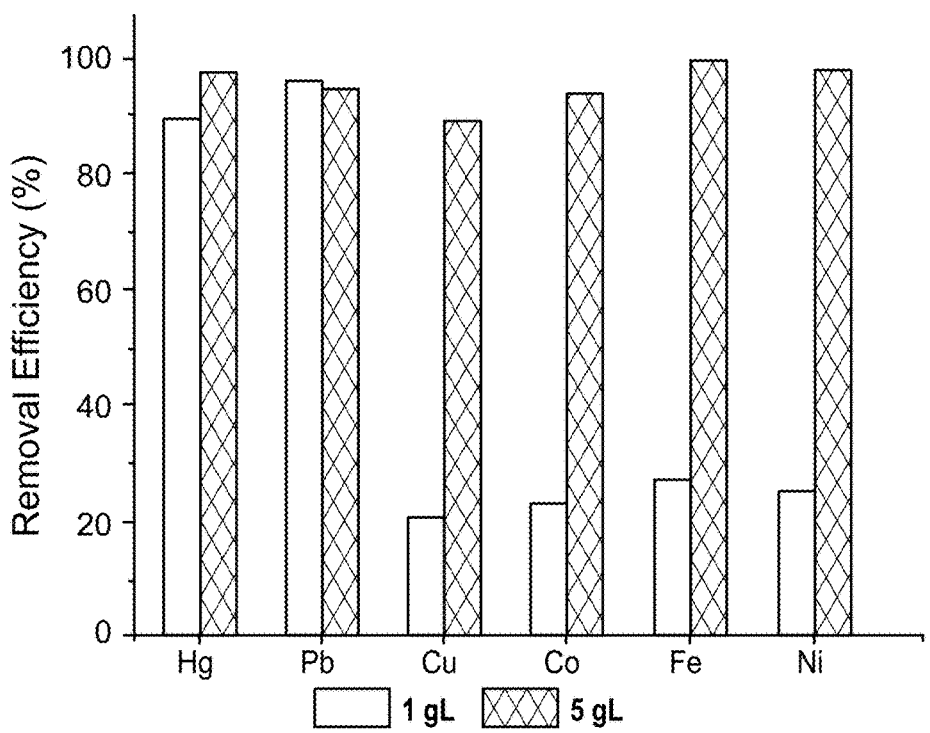

FIG. 15. Treatment of mixed metal ion solution with solid sorbent.

Figure 16:
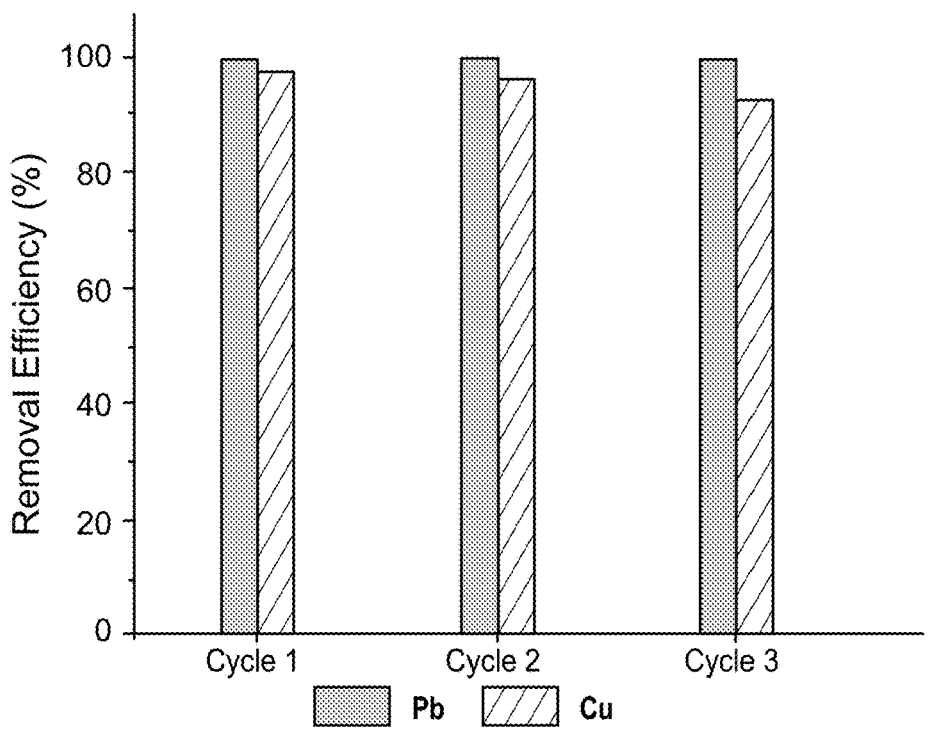

FIG. 16. Flow-through adsorption and regeneration of the solid sorbent.

Figure 17:
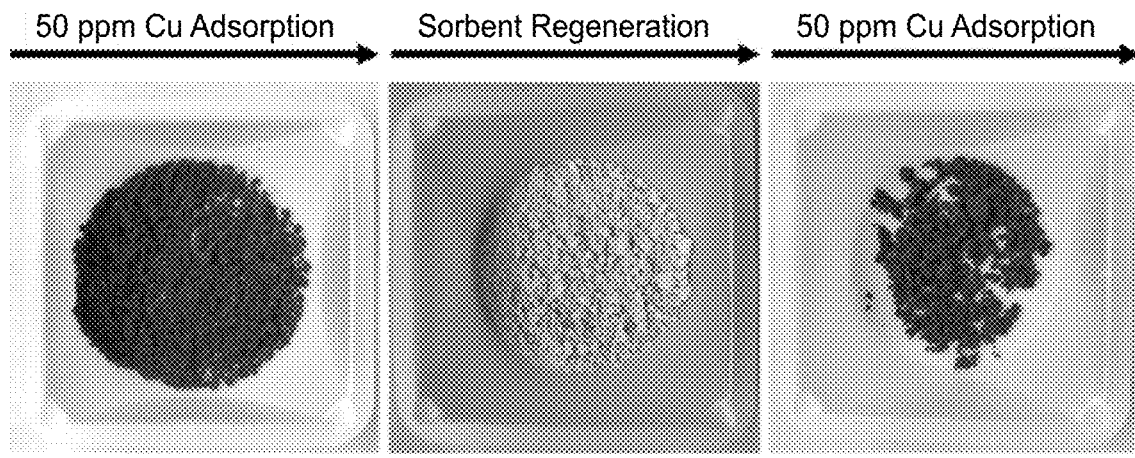

FIG. 17. Visual sorbent color change from adsorption to regeneration with Cu.

Figure 18:
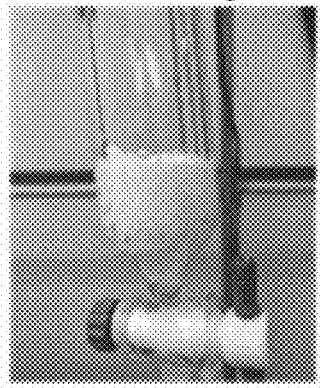
Figure 18:
Figure 18:
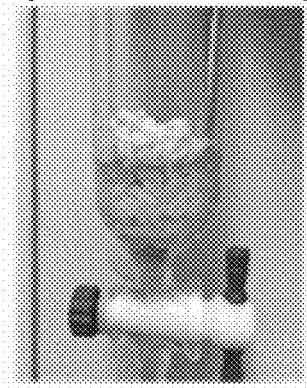

FIG. 18. Chromatographic separation of Hg(II) by solid sorbent.

Figure 19:
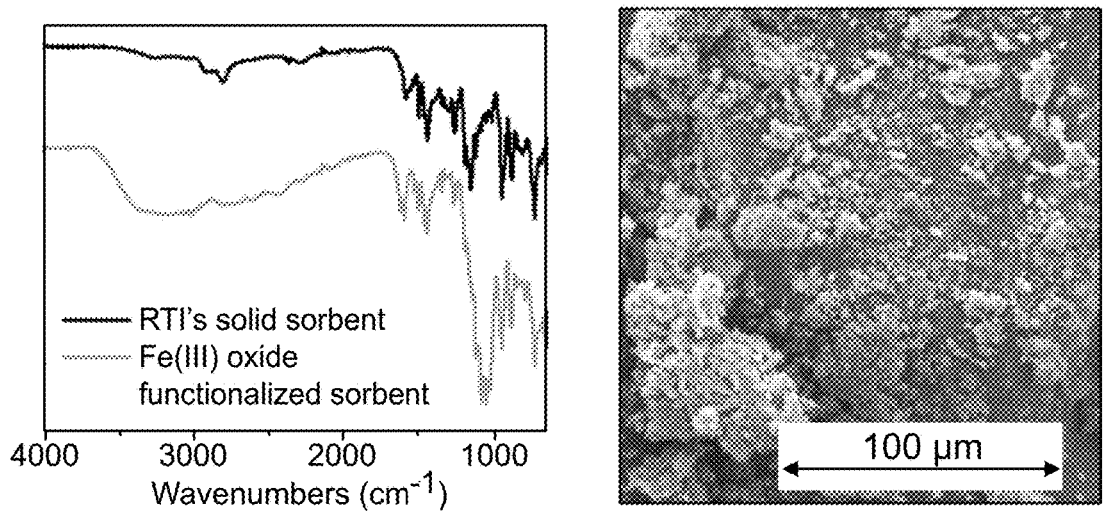

FIG. 19. Characterization of Fe(III) supported P-dendrimer solid sorbent for As removal panel A FT-IR and panel B SEM.

Figure 20:
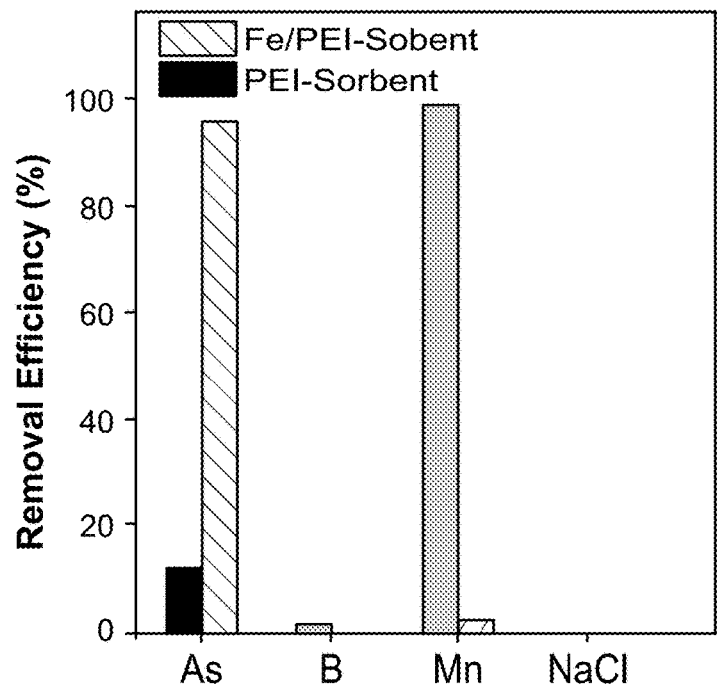

FIG. 20. Removal of As(II) and As(IV) from modeled ground water solution with the solid sorbent and Fe(III) oxide functionalized solid sorbent.

Figure 21:
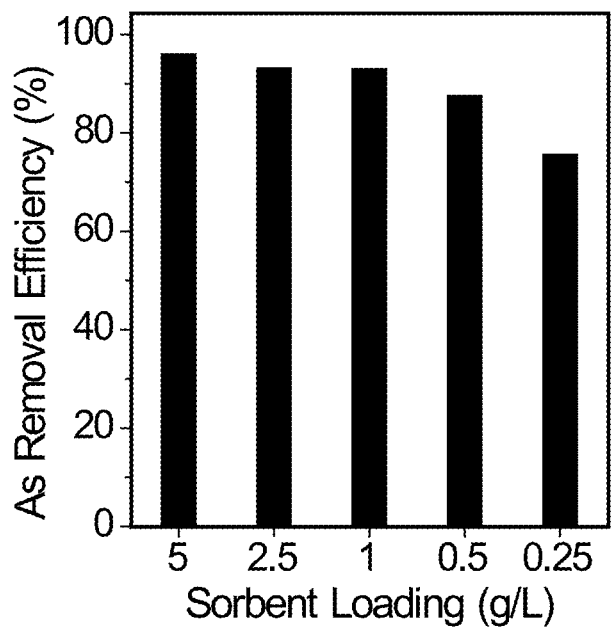

FIG. 21. Sorbent loading effect on As removal.

Figure 22:
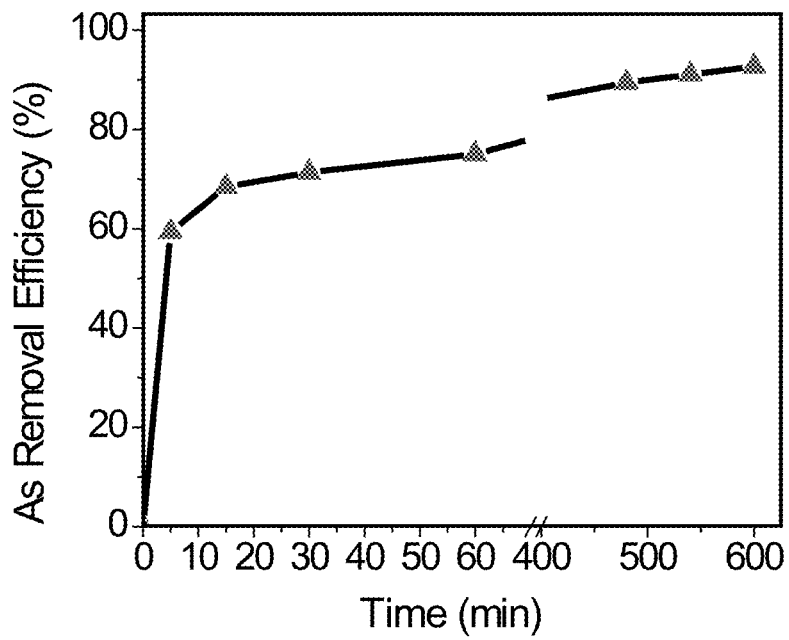

FIG. 22. Kinetics for As removal with the solid sorbent.

Figure 23:
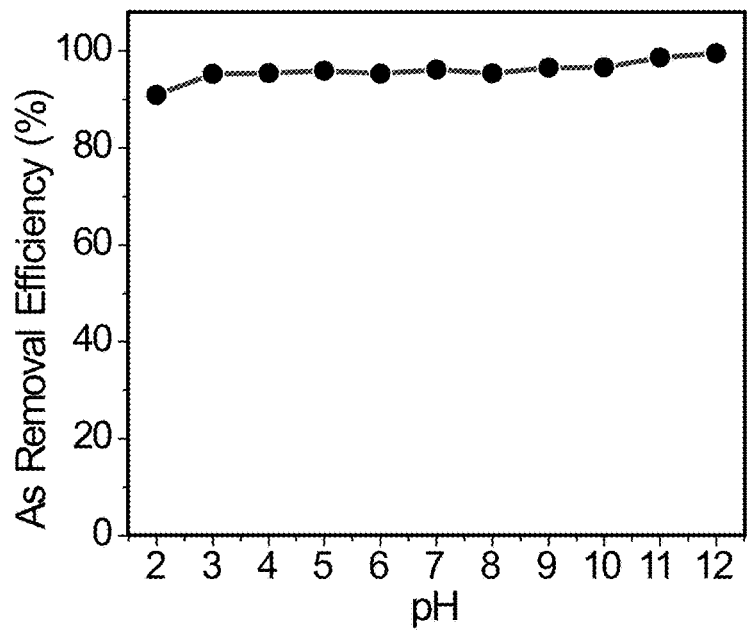

FIG. 23. pH Effect on As removal with the solid sorbent.

Figure 24:
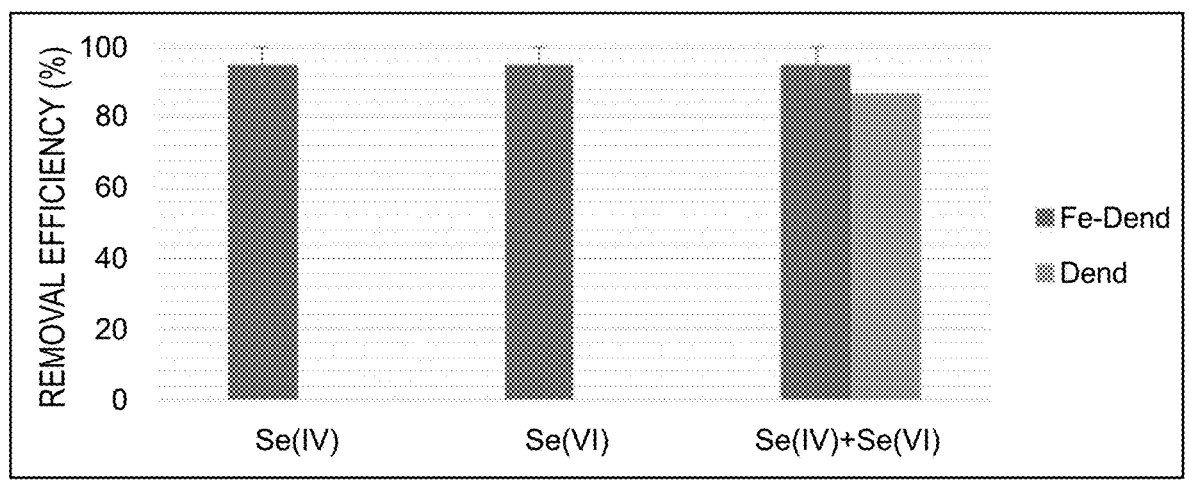

FIG. 24. Batch Removal of selenite, Se(IV), and selenate, Se(VI), with the iron-functionalized solid sorbent.

Figure 25:
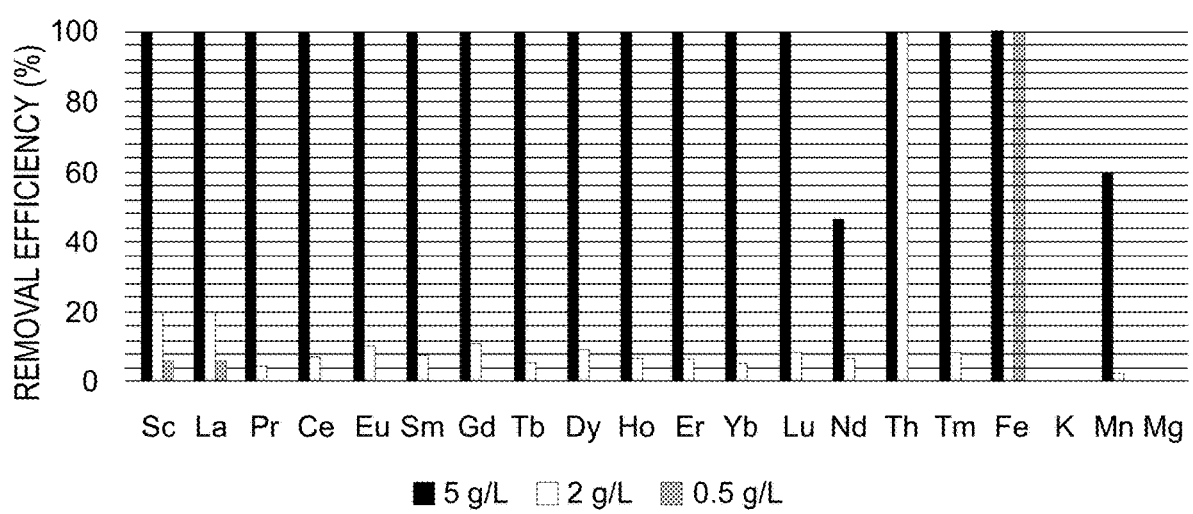

FIG. 25. Batch REE removal by solid sorbent at different loadings.

5. DETAILED DESCRIPTION OF THE DISCLOSURE

This disclosure describes the preparation of an adsorbent directly from the reaction between a polyamine compound with a phosphorous dendrimer to provide a solid, water-stable material with a high degree of amine functionality. The dendrimers were recently disclosed in two publications from the inventors describing their preparation, their physical properties, and their uses for $CO_2$ capture.[8,9]

The synthetic pathway involves a cross-linking reaction between polyamines with polyaldehyde phosphorous dendrimers, which provides easy access to a solid compound that can be scaled. Phosphorous dendrimers (P-dendrimers) are polymer star-like materials, and can be employed as a cross-linking agent to form solid sorbents. P-dendrimers can be synthesized by straightforward means and commonly are functionalized at terminal positions by reactive end groups, such as aldehydes.[10] In general, P-dendrimers are thermally stable robust compounds that can be advantageously employed for materials applications. P-dendrimers can range in size based on the number of branches emanating from the central core, with each branch being called a "generation." The use of a dense compound layered with aldehydes provides an excellent anchor to react with many amine functionalities to rigidify and ultimately solidify polyamine compounds.

Importantly, the sorbent preparation is modular allowing for the preparation of materials with various amine content and core structures to fine tune the sorbent's reactivity. The P-dendrimer core and generation growth unit of the sorbent synthesis can be altered to modify the morphology of the sorbent. P-dendrimers of generation 0 to 12 can be employed. Any polyamine (≥2 amine functionalities) can be employed to prepare a chelating solid sorbent.

The P-dendrimer solid sorbent materials were found to be excellent candidates for heavy metal and REE removal from liquid sources, for both batch and column flow-through removal applications. The disclosed solid sorbents have high capacities, removing the metals to trace levels (ppb concentrations). Importantly, the sorbents described show excellent stability to acid and bases, showing no decomposition and allow them to operate under harsh conditions for metal removal. Various parameters for metal removal were examined (pH, kinetics, co-contaminant effect, flow-through rates) with the sorbent excelling under all conditions.

5.1. Sorbent Preparation

The solid sorbent is prepared in a one-pot two, step procedure involving 1) a condensation reaction between amine functionality of a polyamine compound and aldehyde moieties of a polyaldehyde compound to form imine intermediates; followed by 2) a reduction of the imine intermediates with sodium borohydride to form alkyl amines; otherwise known as a reductive amination process (FIG. 1). This twostep sequence covalently locks polyamine compounds, such as PEI, together through aldehyde units to form a solid sorbent. Between steps, the imine-containing compound is washed with tetrahydrofuran and crushed using a mortar pestle to remove unreactive amine starting materials. The target compound is isolated by filtration and is washed with water, methanol, and diethyl ether to remove sodium borohydride remnants and any soluble organic species. Both reactions take place at room temperature under stirring conditions with no precaution taken to exclude air or moisture. The aldehyde compound employed may be commercially available or synthesized through standard laboratory methods. These compounds may also be formed through direct alkylation conditions. The final sorbent can be sieved or crushed to desired particle sizes.

5.2. Example Sorbent Procedure

A polyaldehyde P-dendrimer (1 equivalence) was dissolved in tetrahydrofuran (0.005-0.1 M concentration) and stirred open to air in a round bottomed flask. The polyamine compound (0.1-1.0 equivalence) was dissolved in tetrahydrofuran (0.2-0.5 M) and added rapidly to the above mixture, producing a white solid that begins forming anywhere from 5 seconds to 1 hour. The reaction was left to stir for 2 hours. The imine intermediate was filtered and washed several times with tetrahydrofuran, then crushed with a mortar and pestle to a powder. The powder was transferred to a new round bottomed flask, dispersed in tetrahydrofuran/methanol (2:1 ratio, 0.001-0.1 M) and stirred. To this mixture was added excess sodium borohydride (>5 equivalence) and let stir for 5-24 hours. After completion, the mixture was filtered, washed with water, with methanol, and with diethyl ether and dried (FIG. 2). The resulting compound was shelf stable and no precautions were taken for storage.

5.3. Polyaldehyde Component

The aldehyde component of the sorbent synthesis must possess 2 or greater aldehyde functional groups. Aldehydes can react with amine functional groups of either singular or separate polyamine compounds to produce an insoluble imine compound. The imine compound is composed of a network of bonds, like that of a cross-linked polymer, whereas the aldehyde unit is randomly dispersed in the material through multiple linkages. Sorbents were prepared from a variety of polyaldehyde compounds, and their reactions with polyamine compounds. Changing either component can affect the morphology and the capacity of the sorbent.

The P-dendrimers used in this study are easily prepared by literature known procedures, or slight modifications therein, through the addition of nucleophiles to an electrophilic phosphorous-containing species. Two examples of P-dendrimer building blocks used in this study are thiophosphoryl chloride and hexachlorophosphazene. An example of a common nucleophile that can be added to these phosphorous chloride compounds is 4-hydroxybenzaldehyde. The P-dendrimers may be synthesized from other nucleophiles to yield compounds with aldehyde functionality for use in making solid sorbents. The preparative method for forming solid sorbents is not limited to P-dendrimer compounds, but may be synthesized from other molecules with 2 or greater aldehydes upon reaction with polyamine compounds.

Non-limiting examples of the phosphorus based dendrimer core are shown in FIG. 3.

Non-limiting examples of the starting materials for the polyfunctional aromatic linker are:

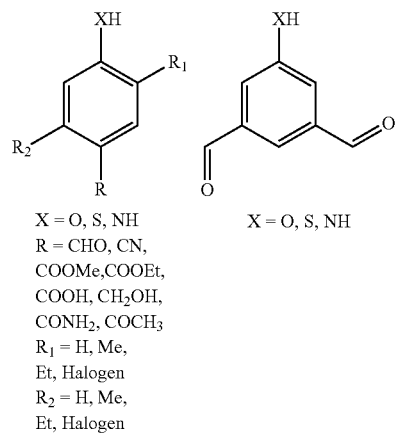

X = O, S, NH
R = CHO, CN, COOMe, COOEt, COOH, CH$_2$OH, CONH$_2$, COCH$_3$
R$_1$ = H, Me, Et, Halogen
R$_2$ = H, Me, Et, Halogen

X = O, S, NH

5.4. Polyamine Component

The polyamine component of the solid sorbent may possess 2 or greater amine functionalities for the reaction with the aldehyde component. The amines may be commercially available and are cost-effective for synthesizing solid sorbents. Amines used to make solid sorbents through this method, but not limited to, are ethylenediamine, diethylenetriamine, tetraethylenepentamine, and linear and branched polyethyleneimines. Other amine compounds bearing additional functionalities may be employed to synthesize solid sorbents through the described method.

Non-limiting examples of polyamines are shown in FIG. 4.

Various polyamine (≥2 primary amines) may be reacted with polyaldehyde P-dendrimer compounds to form solid sorbents.

The sorbents described herein may be incorporated into composite materials. Non-limiting examples of composite materials are described below.

Surface: Composite materials were made using different carbon sheets with or without micro-porous layers. For each of these surfaces, the Hexakis(4-formylphenoxy)cyclo(triphosphazene)-PEI Complex and Kynar UltraFlex®B Resin were used. Commercially available carbon sheets comprising micro-porous layers used in this study are: Sigracet 10BC, 24BC, 25BC, 34BC, 10BA, and 24BA. Glass and metal surfaces (stainless steel) could also be coated.

Dendrimer: Using the Sigracet 24BC surface layer and Kynar UltraFlex®B Resin, the Hexakis(4-formylphenoxy) cyclo(triphosphazene)-Tetraethylenediamine Complex was used.

Resin: Using the Sigracet 24BC surface layer and Hexakis (4-formylphenoxy)cyclo(triphosphazene)-PEI Complex, various resins were analyzed. The resins tested were: Methocel and Kynar Flex® 2801.

5.5. Definitions

While the following terms are believed to be well understood by one of ordinary skill in the art, the following definitions are set forth to facilitate explanation of the presently disclosed subject matter.

"Alkyl" refers to a saturated, branched or straight-chain monovalent hydrocarbon group derived by the removal of one hydrogen atom from a single carbon atom of a parent alkane. Typical alkyl groups include, but are not limited to, methyl, ethyl, propyls such as propan-1-yl, propan-2-yl, and cyclopropan-1-yl, butyls such as butan-1-yl, butan-2-yl, 2-methyl-propan-1-yl, 2-methyl -propan-2-yl, cyclobutan-1-yl, tert-butyl, and the like. The alkyl group may be substituted or unsubstituted; for example, with one or more halogens, e.g., trifluoromethyl. In certain embodiments, an alkyl group comprises from 1 to 20 carbon atoms. Alternatively, an alkyl group may comprise from 1 to 8 carbon atoms.

"Aryl" refers to a monovalent aromatic hydrocarbon group derived by the removal of one hydrogen atom from a single carbon atom of a parent aromatic ring system. Aryl encompasses 5- and 6-membered carbocyclic aromatic rings, for example, benzene or cyclopentadiene; bicyclic ring systems wherein at least one ring is carbocyclic and aromatic, for example, naphthalene, indane; or two aromatic ring systems, for example benzyl phenyl, biphenyl, diphenylethane, diphenylmethane. The aryl group may be substituted or unsubstituted, for example with a halogen.

"Halogen" refers to a fluoro, chloro, bromo, or iodo group.

"Heavy metal" refers to metals of environmental or health concerns. Examples of heavy metals in this disclosure: antimony (Sb), arsenic (As), bismuth (Bi), cadmium (Cd), chromium (Cr), cobalt (Co), copper (Cu), germanium (Ge), indium (In), lead (Pb), manganese (Mn), mercury (Hg), nickel (Ni), osmium (Os), platinum (Pt), selenium (Se), silver (Ag), thallium (Tl), tin (Sb), uranium (U), and zinc (Zn).

As used herein the term "metal" includes metals of the periodic table such as cadmium (Cd), lead (Pb), mercury (Hg), beryllium (Be), barium (Ba), copper (Cu), manganese (Mn), nickel (Ni), tin (Sn), vanadium (V), zinc (Zn), chromium (Cr), iron (Fe), molybdenum (Mo), tungsten (W), cobalt (Co), gold (Au), uranium (U) and silver (Ag). The term metal encompasses metalloids or semi-metallic elements such as arsenic (As), selenium (Se), polonium (Po) and tellurium (Te). In preferred embodiments, metals of this disclosure include elements found either naturally in the environment or man-made contamination and with relatively high human, animal or environmental toxicity, such as arsenic (As), cadmium (Cd), mercury (Hg), lead (Pb) and chromium (Cr). As used herein the term metals includes heavy metals and rare earth metals (REE).

As used herein "rare earth metal" (REE) refers to Group III elements including scandium (Sc) and yttrium (Y). Specifically, REEs are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

The term "solid support" means materials with a hydrophilic macroporous material, of either polymer or inorganic nature, may be used in the present. The solid support may be an acrylamide derivative, agarose, carbon, cellulose, chitin, chitosan, dextran, glass, magnetite, polyacrylate, polyacrylamide, polystyrene, polyvinyl alcohol, silica, silicon, zirconia, alumina and combinations thereof. The solid support material may be in the form of porous beads, which may be spherical. Alternatively, the support may be particulate or divided form having other regular or irregular shapes. Other examples of suitable solid support materials include membranes, semi-permeable membranes, capillaries, microarrays, monoliths, multiple-well plates comprised of alumina, alumina supported polymers, or polysaccharides. Solid supports of the present invention may be rigid or non-rigid flexible materials, such as a fabric which may be woven or non-woven. Suitable non-rigid flexible materials might be membranes (cast, non-woven, or micro- or nano-fibers produced with different techniques known in the art).

Throughout the present specification, the terms "about" and/or "approximately" may be used in conjunction with numerical values and/or ranges. The term "about" is understood to mean those values near to a recited value. For example, "about 40 [units]" may mean within ±25% of 40 (e.g., from 30 to 50), within ±20%, ±15%, ±10%, ±9%, ±8%, ±7%, ±6%, ±5%, ±4%, ±3%, ±2%, ±1%, less than ±1%, or any other value or range of values therein or there below. Alternatively, depending on the context, the term "about" may mean ±one half a standard deviation, ±one standard deviation, or ±two standard deviations. Furthermore, the phrases "less than about [a value]" or "greater than about [a value]" should be understood in view of the definition of the term "about" provided herein. The terms "about" and "approximately" may be used interchangeably.

Throughout the present specification, numerical ranges are provided for certain quantities. It is to be understood that these ranges comprise all subranges therein. Thus, the range "from 50 to 80" includes all possible ranges therein (e.g., 51-79, 52-78, 53-77, 54-76, 55-75, 60-70, etc.). Furthermore, all values within a given range may be an endpoint for the range encompassed thereby (e.g., the range 50-80 includes the ranges with endpoints such as 55-80, 50-75, etc.).

As used herein, the verb "comprise" as used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

The following Examples further illustrate the disclosure and are not intended to limit the scope. In particular, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

6. EXAMPLES

6.1. P-Dendrimer/Low Molecular Weight Polyamine Sorbents

All solvents and reagents were reagent grade and used as received. Thin layer chromatography (TLC) analysis was run on silica gel plates purchased from EMD Chemical (silica gel 60, F254). $^1$H NMR and $^{31}$P NMR spectra were recorded on a Bruker Avance (300 MHz for $^1$H, 121 MHz for $^{31}$P). Chemical shifts are reported as parts per million (ppm) using residual solvent signals as internal standard (CHCl$_3$, δ=7.26 ppm for $^1$H NMR). Data for $^1$H NMR were presented as follows: chemical shifts (δ, ppm), multiplicity (s=singlet, d=doublet, t=triplet, dd=doublet of doublets, m=multiplet), coupling constant (Hz), and integration. The chemical shifts of peaks found were reported for $^{31}$P NMR spectra. Fourier transformed infrared spectra were obtained on a PerkinElmer Spectrum 100FT-IR spectrometer on neat samples (ATR FT-IR). Scanning electronic microscopy (SEM) images were obtained using an FEI Quanta 200 variable pressure scanning electron microscope. Thermal stability measurements were conducted on a Mettler Toledo thermogravimetric analyzer (TGA) using a 5° C./min step to 1000° C. under an air atmosphere. Nitrogen sorption isotherms at 77 K were obtained with a Micromeritics ASAP 2020 apparatus. Prior to measurement, the samples were degassed for 6 h at 120° C. The surface area was determined assuming a surface coverage of the nitrogen molecule estimated at 13.5 Å.

Carbon dioxide sorption isotherms were obtained at 0° C. Elemental Analysis was conducted on an Elemental Analyzer Flash 2000 C/H/N/S instrument.

6.1.1. Preparation of Cross-linked sorbents

Synthesis of hexa(4-formylphenoxy)cyclotriphosphazene (HAPCP)—1-G$_0$

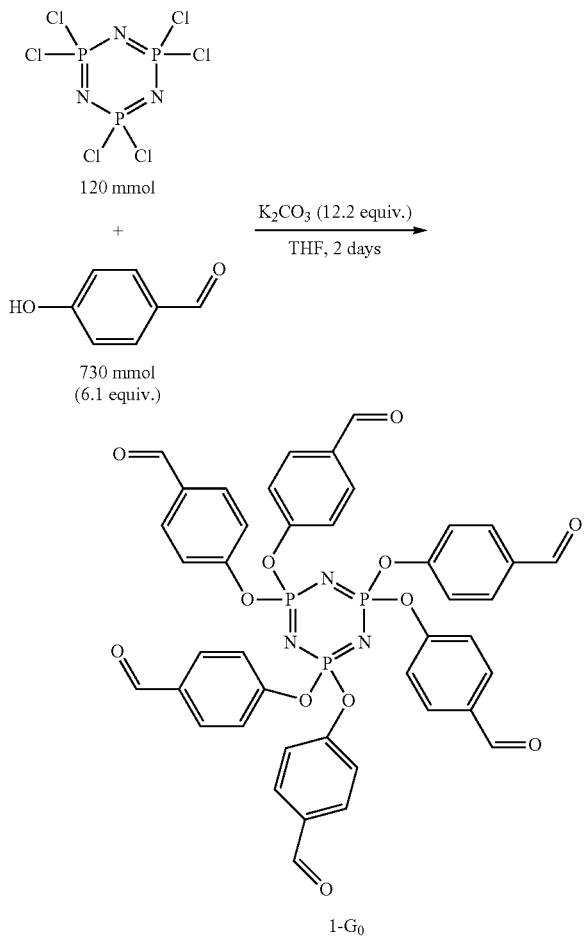

Procedure adapted from literature (C. Wang et al., RSC Adv 2015, 5, 88382) and prepared as follows: To a dry 2 L 3-neck round bottomed flask was added potassium carbonate (202 g, 1.5 mol, 12.2 equiv.) and 4-hydroxybenzaldehyde (89.4 g, 0.73 mol, 6.1 equiv.). The solids were dissolved in HPLC grade tetrahydrofuran (1.3 L, 0.1 M) and heated to reflux via a heating mantle for 4 hours under a nitrogen atmosphere with stirring conditions. Afterwards the flask was removed from the heat and while warm, hexachlorophosphazene (42 g, 0.12 mol, 1 equiv.) was added portion wise over 10 minutes and the mixture was left to stir under nitrogen for 48 hours. The solvent was then removed under rotary evaporation and the remaining solids were dissolved with 200 mL of chloroform and 300 mL of an aqueous 3 N NaOH solution. The organic layer was separated, and the aqueous layer was extracted 3× with chloroform (100 mL). The combined organic layers were concentrated under rotary evaporation to form a yellow solid. The solid was dissolved with 500 mL of hot ethyl acetate and left to recrystallize overnight. The product was isolated via vacuum filtration, washing with 100 mL of ethyl acetate, to yield white crystals of hexa(4-formylphenoxy)cyclotriphosphazene 1-$G_0$ (90.5 g, 105 mmol, 88% yield). $^1$H NMR (300 MHz, CDCl$_3$) δ 9.94 (s, 6 H), 7.74 (d, J=9.0 Hz, 12 H), 7.14 (t, J =9.0 Hz, 12H). $^{31}$P NMR (121 MHz, CDCl$_3$) δ 7.07 (s). Anal. Found: C, 57.78; H, 3.41; N, 4.98. $C_{42}H_{30}N_3O_{12}P_3$ Calc.: C, 58.55; H, 3.51; N, 4.88%.

Synthesis of Generation 1 of HAPCP—1-$G_1$

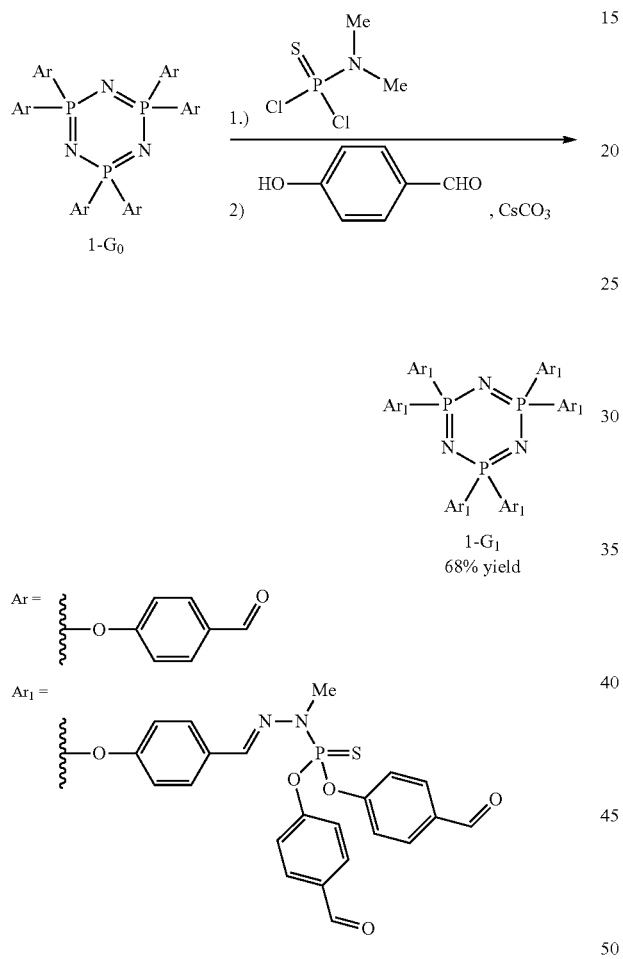

Procedure adapted from literature (N. Launay et al., *J. Organometal. Chem.* 1997, 529, 51) and prepared as follows: To a dry round bottomed flask was added 1-$G_0$ (7.76 g, 9.0 mmol, 1 equiv.) and chloroform (90 mL, 0.1 M). The mixture was cooled to 0° C. under a nitrogen atmosphere and while stirring, dichlorophosphonomethylhydrazide (M. L. Lartigue, et al., *Bull Soc Chim Fr* 1997, 134, 981) (10.47 g, 58.5 mmol, 6.5 equiv.) was added dropwise. The reaction was allowed to stir overnight and warm to room temperature. After judging the reaction complete via TLC analysis, the solvent was removed under rotary evaporation to afford a thick white oil. The condensed hydrazine complex was obtained as an off-white solid (~16 g) after precipitation in hexanes and vacuum filtration, while washing with hexanes. The intermediate compound was added to a dry round bottomed flask with 4-hydroxybenzaldehyde (15.4 g, 126 mmol, 14 equiv.) and the solids were dissolved in tetrahydrofuran (450 mL, 0.02 M). To the stirring mixture was added anhydrous cesium carbonate (82.2 g, 252 mmol, 28 equiv.) and the reaction was left to stir overnight. After judging the reaction complete via TLC analysis, the solvent was removed under rotary evaporation and the remaining solids were dissolved with 100 mL of chloroform and 100 mL of an aqueous 1 N NaOH solution. The organic layer was separated, and the aqueous layer was extracted 3× with chloroform (50 mL). The combined organic layers were concentrated under rotary evaporation to give 1-$G_1$ (17.55 g, 6.1 mmol, 68% yield) as a white solid. $^1$H NMR (300 MHz, CDCl$_3$) δ 9.87 (s, 12 H), 7.80 (d, J=8.5 Hz, 24H), 7.67-7.52 (m, 12H), 7.32 (d, J=7.6 Hz, 24H), 7.01 (d, J=8.5 Hz, 12H), 3.32 (d, J=10.5 Hz, 18H). $^{31}$P NMR (121 MHz, CDCl$_3$) δ 60.43 (s), 7.97 (s). Anal. Found: C, 53.23; H, 3.71; N, 7.37; S, 6.60. $C_{132}H_{108}N_{15}O_{30}P_9S_6$ Calc.: C, 55.52; H, 3.81; N, 7.36; S, 6.74%.

Synthesis of Generation 2 of HAPCP—1-$G_2$

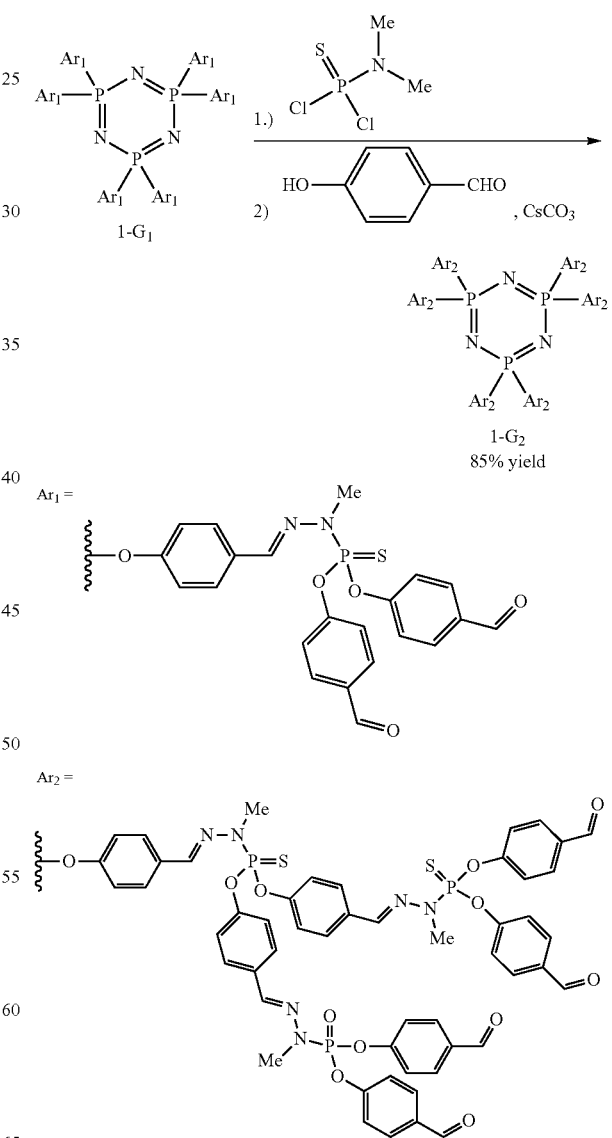

Procedure followed the synthesis pathway for 1-$G_1$ using the modified conditions: for condensation step was used 1-$G_1$ (4.5 g, 1.6 mmol, 1 equiv.), chloroform (30 mL, 0.05 M), and dichlorophosphonomethylhydrazide (3.7 g, 20.7 mmol, 13 equiv.); for the addition step was used 4-hydroxybenzaldehyde (4.87 g, 40 mmol, 26 equiv.), tetrahydrofuran (250 mL, 0.006 M)., and anhydrous cesium carbonate (26.1 g, 80 mmol, 52 equiv.). The desired compound 1-$G_2$ (9.26 g, 1.35 mmol, 85% yield) was obtained as a white powder. $^1$H NMR (300 MHz, CDCl$_3$) δ 9.88 (s, 24H), 7.80 (d, J=5.9 Hz, 48H), 7.58 (m, 54H), 7.28 (m, 48H), 7.17 (d, J=8.1 Hz, 24H), 6.93 (m, 12H), 3.49-3.26 (m, 54H). $^{31}$P NMR (121 MHz, CDCl$_3$) δ 62.32 (s), 60.28 (s), 8.20 (s). Anal. Found: C, 50.73; H, 3.66; N, 7.59; S, 7.83. $C_{312}H_{264}N_{39}O_{66}P_{21}S_{18}$ Calc.: C, 54.76; H, 3.89; N, 7.98; S, 8.43%.

Synthesis of o,o,o-tris(4-formylphenyl)phosphorothioate (TPPT)—2-$G_0$

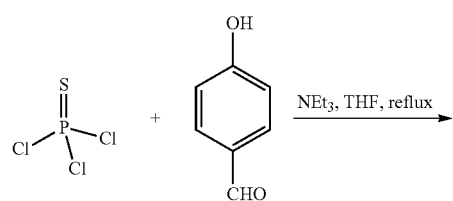

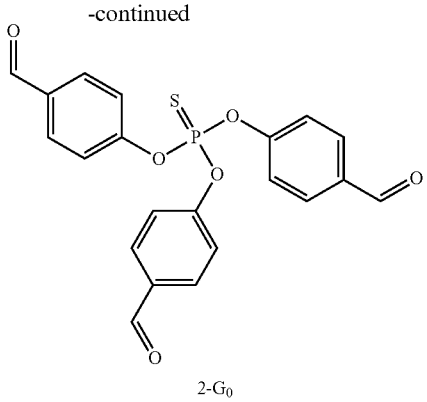

2-$G_0$

Prepared according to literature procedure (N. Launay et al., *Angew. Chem. Int. Ed. Engl.* 1994, 33, 1589).

$^1$H NMR (300 MHz, CDCl$_3$) δ 10.01 (s, 3H), 7.95 (d, J=8.2 Hz, 6H), 7.42 (dd, J=8.5, 1.5 Hz, 6H). $^{31}$P NMR (121 MHz, CDCl$_3$) δ 49.78 (s). Anal. Found: C, 58.24; H, 3.54; S, 7.30. $C_{21}H_{15}O_6PS$ Calc.: C, 59.16; H, 3.55; S, 8.7.52%.

Synthesis of Generation 1 of TPPT—2-$G_1$

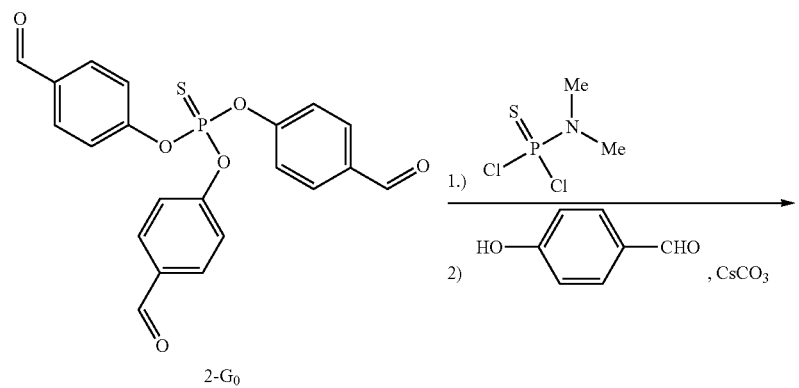

2-$G_0$

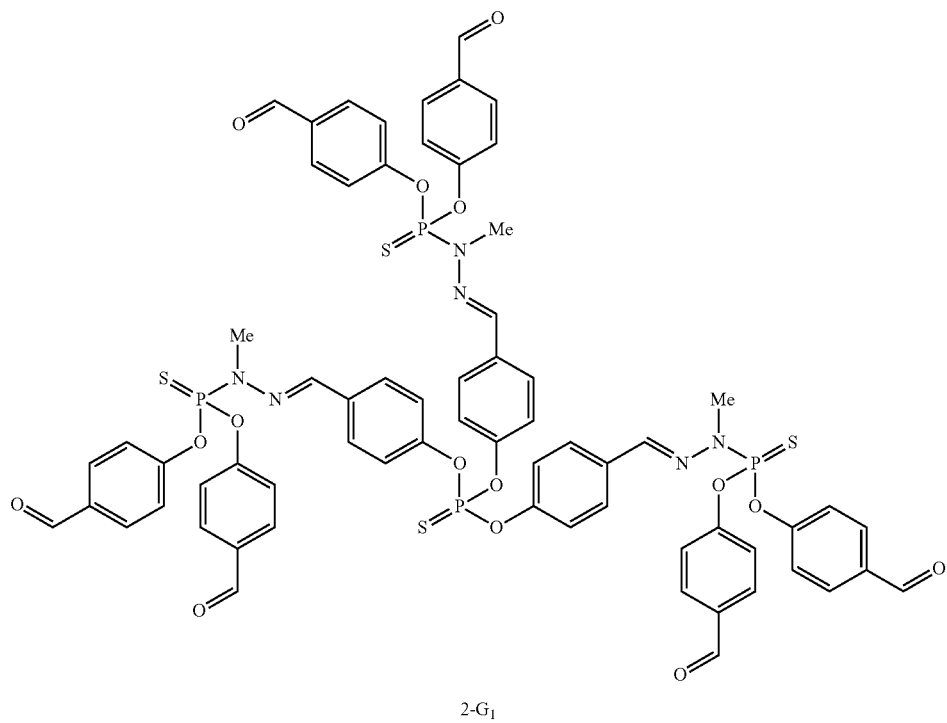

2-G$_1$

Prepared according to literature procedure (Launay 1994).

$^1$H NMR (300 MHz, CDCl$_3$) δ 9.90 (s, 6H), 7.80 (d, J=9.0 Hz, 12H), 7.61 (m, 6H), 7.31 (d, J=7.5 Hz, 12H), 7.26 (m, 6H), 3.35 (dd, J =15.8, 9.2 Hz, 9H). $^{31}$P NMR (121 MHz, CDCl$_3$) δ 60.18 (s), 52.38 (s). Anal. Found: C, 54.08; H, 4.05; N, 7.86; S, 8.26. C$_{66}$H$_{54}$N$_6$O$_{15}$P$_4$S$_4$ Calc.: C, 55.70; H, 3.82; N, 5.90; S, 9.01.

Example preparation of a cross-linked sorbent with TEPA: The sorbent preparation was carried out in round-bottom flasks under air atmosphere with commercially available polyamines. The sorbent preparation for each P-dendrimer and polyamine was optimized. For example, the synthesis of a sorbent prepared from 1-G$_0$ and TEPA (termed 1-G$_0$-TEPA) proceeds as follows: To a 50 mL round bottom flask was added hexa(4-formylphenoxy)cyclotriphosphazene 1-G$_0$ (0.5 g, 0.58 mmol, 1 equiv.) and tetrahydrofuran (10 mL, 0.06 M). The flask was heated until all solids were dissolved and left to stir open to air. While warm, a solution of TEPA (0.55 g, 2.9 mmol, 5 equiv.) in 3 mL tetrahydrofuran was added rapidly (under 5 s) to the above stirring mixture. In under 10 s, a white solid formed and was allowed to stir (or sit if the stir bar was frozen) for 1 hour. Then, the solids were isolated via vacuum filtration, washed with tetrahydrofuran (50 mL), crushed with a mortar and pestle, and placed in a new 100 mL round bottomed flask. The solids were suspended in 40 mL of tetrahydrofuran and 20 mL of methanol while stirring open to air. To this mixture was added anhydrous sodium borohydride (430 mg, 12 mmol, 20 equiv.) at room temperature and the reaction was left to stir for 14 hours under nitrogen. The mixture was then filtered under vacuum and the solid obtained was washed with 50 mL of distilled water, 50 mL of methanol, and 25 mL of diethyl ether. The washings produced a white powder that was further dried under reduced pressure, resulting in 470 mg of 1-G$_0$-TEPA as a white powder.

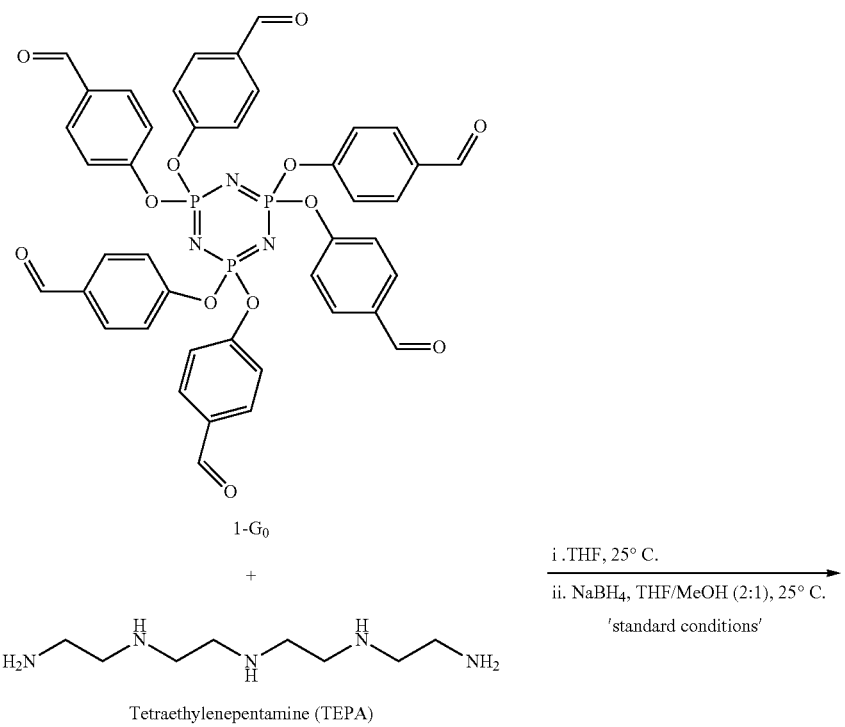
1-G₀
+
Tetraethylenepentamine (TEPA)
i. THF, 25° C.
ii. NaBH₄, THF/MeOH (2:1), 25° C.
'standard conditions'
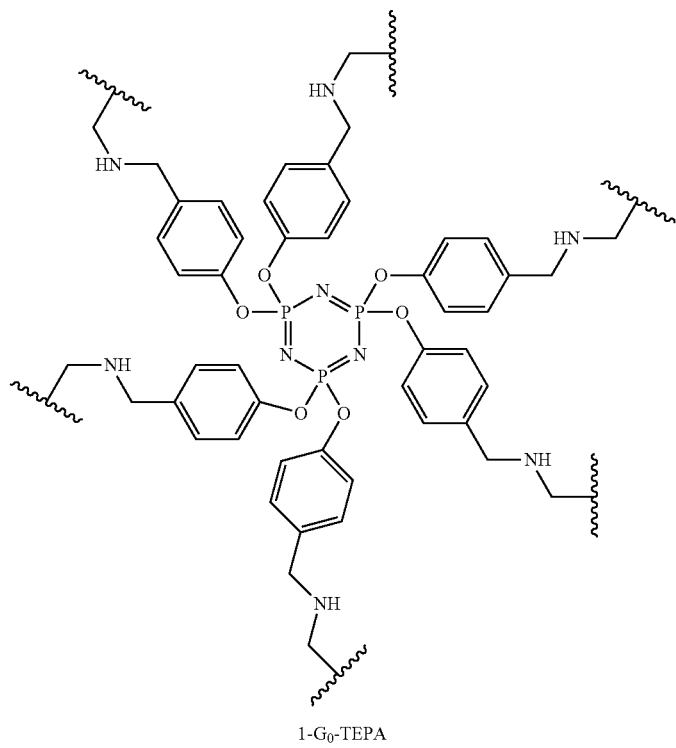
1-G₀-TEPA

TABLE 1

1-G$_0$-TEPA Preparation Conditions and CO$_2$ Capacity TGA Analysis

| Entry | Deviation from 'standard' conditions | 1-G$_0$-TEPA CO$_2$ Capacity (wt %)* |
|---|---|---|
| 1 | none | 6.9 |
| 2 | no NaBH$_4$ | 1.6 |
| 3 | Toluene instead of THF | 3.2 |
| 4 | Dioxane instead of THF | 0 |
| 5 | CHCl$_3$ instead of THF | 0 |
| 6 | MeOH instead of THF | 0 |
| 7 | add 2 drops H$_2$SO$_4$ | 5.4 |
| 8 | 0° C. instead of 25° C. | 4.2 |
| 9 | 40° C. instead of 25° C. | 3.5 |
| 10 | step 1 at 2x dilution with THF | 1.2 |
| 11 | step 1 at 0.5x dilution with THF | 4.6 |
| 12 | slow addition of TEPA | 3.2 |

*Adsorption over 50 minutes

6.2. P-Dendrimer/High Molecular Weight Polyamine Sorbents, e.g., PEI

Example preparation of a cross-linked sorbent with PEI: To a 50 mL round bottom flask was added 600 MW branched PEI (2.78 g, 4.63 mmol, 2 equiv.) and tetrahydrofuran (20 mL, 0.12 M). The flask was heated until the solution was homogeneous. While warm, a solution of hexa(4-formylphenoxy)cyclotriphosphazene 1-G$_0$ (2.0 g, 2.32 mmol, 1 equiv.) in 5 mL tetrahydrofuran was added rapidly to the above stirring mixture. In under 10 s, a white solid formed and was allowed to stir for 1 hour. Then, the solids were isolated via vacuum filtration, washed with tetrahydrofuran (50 mL), crushed with a mortar and pestle, and placed in a new 250 mL round bottomed flask. The solids were suspended in 80 mL of tetrahydrofuran and 40 mL of methanol and anhydrous sodium borohydride (1.7 g, 46 mmol, 20 equiv.) was added at room temperature. The reaction was left to stir for 14 hours under nitrogen and then was then filtered under vacuum and the solid obtained was washed with 100 mL of distilled water, 100 mL of methanol, and 50 mL of diethyl ether. The washings produced a white powder that was further dried under reduced pressure, resulting in 4.22 g (90% yield) of 1-G$_0$/600PEI as a white powder.

6.3. Example Procedure for a Composite Sorbent Material

Example preparation of a cross-linked sorbent composite material: A solution containing 2 mL of acetone and 4.0 mg of PVDF resin Kynar UltraFlex®B was sonicated in a water bath until the resin was completely dissolved. Then, 40 mg of the polyamine P-dendrimer sorbent was added and sonicated for 10 minutes for complete dispersion. The viscous mixture (comprised of 10 wt % binder) was then applied to the surface of a 12.4 mg carbon rectangular sheet in portion wise layers. Once the acetone had evaporated, further coatings were applied until a thick white layer of polymer was obtained. The final material was air dried for one hour to ensure complete dryness before testing. The total amount of polymer/resin bound to the carbon sheet totaled 5.2 mg. The composite material was adhered well to the carbon sheet, with an applied thickness of 4.49 mm in this instance. The thickness is directly related to the number of layers of the polyamine sorbent/resin mixture applied to the carbon sheet.

6.4. Characterization of Solid Sorbents

The solid sorbents prepared herein were characterized by CPMAS Nuclear Magnetic Resonance (NMR) imaging and Fourier Transformed Infared (FUR) spectroscopy to confirm the successful reaction between the aldehyde and amine components via the reductive amination process. The organic content of the sorbent was determined through C/H/N Elemental Analysis (EA) and the thermal stability was determined with Thermogravimetric Analysis (TGA). The surface and morphology integrity of the material was examined with Z-polarized confocal microscopy, Scanning Electron Microscopy (SEM) and Transmission Electron Microscopy (TEM). Surface area and pore size distribution characteristics were determined by N$_2$ isotherms. Although one solid sorbent is described in this invention disclosure, similar characterization data was obtained for other solid sorbents produced.

6.5. Example Sorbent of this Disclosure: Hexakis(4-formylphenoxy)cyclo(triphosphazene)-PEI Complex CPMAS Nuclear Magnetic Resonance (NMR)

The sample's spectrum showed a variety of alkyl and aryl carbon peaks, at ranges of 18-50 ppm and 100-140 ppm respectively. No imine C═N peaks, which occur >160 ppm, were visible. This evidence supports that PEI is covalently bound within the sorbent through stable C—N bonds, via reductive amination of intermediate imines consistent with the structure of 1-G$_0$/600 PEI. The solid state 13C CP/MAS spectrum of 1-G$_0$/600 PEI is shown in FIG. 5.

Fourier Transformed Infrared (FTIR) Spectroscopy

The FTIR spectra of the P-dendrimer component, PEI component, and solid sorbent produced are shown in FIG. 6. The solid sorbent FTIR spectrum is abscent the expected large C═O stretching signal (~1600 cm$^{-1}$) and retains a large N-H stretching signal (3100-3400 cm$^{-1}$) from primary and secondary amines incorporated from PEI. The majority (>95%) of the aldehydes from the P-dendrimer component were reduced through the process.

C/H/N Elemental Analysis (EA)

The results for the C/H/N Elemental Analysis are as follows:

| Nitrogen | Carbon | Hydrogen |
|---|---|---|
| 19.968 | 57.948 | 8.124 |

Thermogravimetric Analysis (TGA)

The sorbent was found to be stable up to 200° C., whereupon it underwent a 20.5 wt % loss event and gradually lost 87 wt % up to 1000° C. The sorbent is thus stable under the CO$_2$ capture conditions and can be regenerated at practical temperatures. The thermogravimetric analysis (TGA) is shown in FIG. 7.

Z-polarized confocal microscope

The Z-polarized confocal microscope image showed large aggregated molecules that had some macroscale crystalinity. The particles are white in color. See FIG. 8.

Scanning Electron Microscopy (SEM)

Images obtained from an SEM were able to distinguish the aggregated particles up to 2.0 μm. No structural order, such as crystaline networks, were observed directly. See FIG. 9A-9C.

N₂ isotherms

The morphology of the sorbent was analyzed through N2 adsorption-desorption isotherms. The $N_2$ physisorption gave a surface area of 11.0 m²/g, with a pore volume and pore size of 0.005 cm³/g and 18.1475 A respectively. The sorbent has a low surface area due to the aggregate, non-crystalline structural integrity of the molecule. The N2 adsorption-desorption isotherms are shown in FIG. 10.

6.6. Sorbent Properties in Water

The sorbents prepared via P-dendrimer and polyamine cross-linking act as hydrogels. Hydrogels are polymeric materials that are hydrophillic and can swell significantly with water.[11] The solid sorbent prepared herein does not dissolve in water, nor in any liquid media (aqueous, organic, acidic, basic). The material absorbs water through hydrogen bonding with the polyamine compound, opening channels in the cross-linked matrix to fill with water. For example, a sorbent prepared was capable of 12.8 g of water uptake per gram of sorbent. Altering the polyaldehyde P-dendrimer or the polyamine will effect the swelling capacity of the solid sorbent. Additionally, these sorbents were found to be extremely stable to acidic and basic conditions. No degradation was observed after submerging the material in either 12 N HCl and 50 wt. % NaOH in water for 30 days. The swelling of the material by water increases the surface area of the sorbent exposed to water, providing an opportunity for chemical species on the surface externally and internally of the sorbent to react with dissolved contaminants. The solid amine sorbents are constituted mainly by ethylenediamine repeating units (accounting for up to 20 wt. % of the sorbent's mass), which can act as chelating agents toward metals.

6.7. Heavy Metal Removal Analytical Testing

The heavy metal content of liquid samples before and after sorbent treatment was determined with a Thermo Series I inductively-coupled plasma mass spectrometer (ICP-MS) equipped with a concentric glass nebulizer, collision cell technology (CCT) and Peltier-cooled glass spray chamber. The removal efficiencies of the sorbents for individual and mixed heavy metal liquid samples was conducted via batch and chromatographic separations.

In a typical batch separation experiment, 200 mL of the heavy metal contaminated water was treated with 1.0 g of the sorbent and left to stir for a set period of time (typically 12 hours). Upon completion, the solution was filtered to remove all traces of solids and the liquid metal content was analyzed via ICP-MS. In a typical chromatographic experiment, a glass fritted column was filled with 2.0 g of solid sorbent (without packing). To this sorbent was added a flowing heavy metal contaminated solution and the treated liquid was captured at the end of the column. Upon completion, the solution was filtered to remove all traces of solids and the liquid metal content was analyzed via ICP-MS.

6.8. Heavy Metal Removal

Evaluation of the sorbent's propensity to bind and remove heavy metals from water was initiated for Hg and Pb removal. Stock solutions of Hg and Pb at both 50 ppm and 500 ppm concentrations were batch treated independently with the P-dendrimer solid sorbent at various loading levels. The sorbent was suspended in the stock solutions and stirred over 10 hours, filtered, and the metal content of the treated solution was determined via ICP-MS analysis. Treatment of the 50 ppm Hg solution with the sorbent at 1 g/L loading removed 95.6% of Hg ions (FIG. 11A). Increasing the sorbent loading to 5 g/L increased the removal to 98.6%. At higher concentrations, Hg was capable of being removed at >99% efficiencies from 1 to 5 g/L loading from a 500 ppm solution (FIG. 11B). Pb removal was more effective from both 50 ppm and 500 ppm solutions, with >99% removal efficiency observed for all sorbent loadings. No amount of Hg or Pb in water is considered safe, therefore >99% removal is always desired; which was achieved with the sorbent at 5 g/L loading.

The effect of the sorbent loading and capacity of the sorbent to remove metals was expanded for Cu, Co, Fe, and Ni; naturally occurring metals that require regulation in ground water and are prevalent in waste waters. Treating contaminated solutions with the sorbent at 1 g/L loading showed poor removal efficiencies for Cu, Co, Fe, and Ni (FIG. 12A). Increasing the loading to 5 g/L improved the removal efficiencies significantly; Co was removed by 89.6%, Cu and Ni by >96%, and Fe by >99%. A similar trend was observed when treating more concentrated solutions at 500 ppm concentrations (FIG. 12B). At 1 g/L loading of the sorbent, only Hg and Pb could be removed by greater than 95%, with Cu, Co, Fe, and Ni removal efficiencies falling below 50%. Increasing the sorbent loading to 5 g/L dramatically improved the removal efficiencies to desired levels with all metals removed by >90%. The results indicate that the sorbent binds metals at different rates, potentially dictated by the metal's Lewis acidity and ionized species at various pHs.

6.9. Kinetics of Heavy Metal Removal

Rapid adsorption from the initial contact time of the sorbent to the contaminated solution is highly desired for water treatment processes. The kinetic results of individually adsorbing Hg and Pb at 50 ppm concentrations at pH 7 is shown in FIG. 13. Rapid adsorption was observed for both Hg and Pb by the solid sorbent. Within 5 minutes, 55% of Hg and 90% of Pb was removed independent of the sorbent loading level of 1 g/L or 5 g/L. After 30 minutes, 92% of Hg and >95% of Pb was determined to be removed. After 30 minutes the metal concentration was depleted below 5 ppm and the binding of the remaining trace metals was slowed by diffusion kinetics. The rapid binding of Hg and Pb to the sorbent can be explained by the highly chelating nature of the sorbent, composed of repeating ethylenediamine units in a cross-linked matrix. Importantly, the swelling behavior of this sorbent allows for both surface and internal binding of the metals.

6.10. pH Effect on Heavy Metal Removal

The effect of the contaminated water's pH on adsorption was investigated from highly acidic conditions (pH 2) to highly alkaline conditions (pH 12). The unique stability of this sorbent to harsh pH environments (see Section 3.1) permits the opportunity for metal removal from harsh environments. Impressively, the results demonstrate that the sorbent operates with complete activity (97-99% removal) for Hg and Pb removal from pH 2 to 12 (FIG. 14.) For many sorbents, the pH of the solution is the most influencing parameter regarding a sorbent's capacity for removal. For example, at low pH (<4.0) $HgCl_2$ ionizes to $Hg^{2+}$ along with chloride speciation. At higher pH (>4.0), the main species is $Hg(OH)_2$. Typically, sorbents are selective for one of these species and do not provide high removal efficiencies across the pH spectrum. This remarkable efficiency showcases the strong chelation effect of the P-dendrimer solid sorbent.

6.11. Batch treatment of Mixed Metal Contaminated Solution

A mixed metal ion solution, where each metal was fixed at 50 ppm (total concentration of ions: 300 ppm), was treated with the sorbent to evaluate mixed ion competition for binding. The results showed the removal efficiency of Hg and Pb was maintained in the mixed metal environment, largely surpassing Cu, Co, Fe, and Ni removal efficiencies at 1 g/L sorbent loading (FIG. 15). The sorbent removed Hg and Pb with 66% selectivity over the other heavy metal contaminants. Increasing the sorbent loading to 5 g/L was able to bring the removal efficiencies of all the metals above 90% except for Cu (77%). This result demonstrates that the sorbent could be effective to remove toxic metals (Hg and Pb) from aqueous sources even in the presence of other metal ions.

6.12. Heavy Metal Recovery and Sorbent Regeneration

The solid sorbent is capable of adsorbing heavy metals, selectively releasing the metals, and being regenerated for additional adsorption experiments. This capability reduces the cost of the process by allowing the sorbent to be reused repeatidly while maintaining effective heavy metal removal. This process was demonostrated on 50 ppm Pb and Cu solutions through individual ion removal (FIG. 16). After flowing the metal solution through the sorbent bed, the sorbent was found to remove >99% Pb and 98% Cu. The metal-bound sorbent was regenerated by the addition of 1 N HCl to strip the sorbent of the metal and washed with water for deinonization. The sorbent maintained >99% Pb and >93% Cu removal efficiencies over 3 cycles of adsorption and regeneration. The effectiveness of the regeneration was visually observed by the dramatic color change of the Cu-bound sorbent (dark) to the free amine sorbent (white) (FIG. 17).

6.13. Chromatographic Demonstration of Heavy Metal Removal

A flow through experiment was designed to determine if this sorbent could actively removal heavy metals from flowing liquids instead of static absorption. A glass column (2" diameter) was loaded with 2.0 g of loosely packed P-dendrimer sorbent. A 400 mL solution of 50 ppm of $HgCl_2$ in water was added at a rate of ~13.3 mL/min to the column so that the entire solution had passed through the sorbent after 30 minutes. The top layer of the sorbent slowly turned gray over time as the solution was passed through, indicating mercury adsorption (FIG. 18). The filtered water was collected and analyzed by ICP spectroscopy to find the treated solution's containing <0.1 ppm of Hg, indicating 99.8% removal. Additionally, the sorbent was found capable of removing a solution of 50 ppm Pb through this flow-through design with the same efficiency (>99% removal) with the 13.3 mL/min flow rate. The sorbent was capable of removing Hg and Pb from a concentrated stream (50 ppm) to below the EPA's regulatory limit for drinking water.

6.14. Arsenic Removal

Arsenic is commonly found in water in the form of inorganic species As(V) or As(III). Arsenic has proven particularly challenging to remove through a variety of techniques, including coagulation and flocculation, precipitation, membrane filtration, ion exchange and adsorption. For example, activated carbon was only capable of removing a few milligrams of As per gram of carbon, therefore rendering this approach expensive and unpractical. Arsenic occurs in high concentrations in groundwater supplies, making removal from such systems of high importance. Dissolved As(V) and As(III) ions are saturated with oxygen species in ground water and cannot be removed by amine sequestration, however, these ions have a high affinity towards iron oxide surfaces. Iron oxides were embedded into the matrix of our solid sorbents to provide a material that can readily adsorb both As(V) and As(III) ions selectively from a modeled ground water solution containing other metal ions.

6.15. Arsenic-Specific Sorbent

Iron oxides can be embedded within the polymer matrix of the P-dendrimer solid sorbents via impregnation with aqueous $FeSO_4$, resulting in the binding of the iron molecules via amine coordination, and upon exposure to air the Fe(II) species were oxidized to Fe(III) oxides. The support of the Fe(III) oxides onto the sorbent was easily visualized by the change of color from white to reddish-orange, which indicates Fe(III) oxidation state. Analysis of the Fe/PEI-supported sorbent by FT-IR showed exhibited shifts indicative of Fe(III) oxide coordination (FIG. 19, Panel A). SEM analysis displayed that the Fe-supported sorbent is constituted by irregular particles that agglomerate into larger aggregates, similar to RTI's unfunctionalized solid sorbent (FIG. 19, Panel B). Results of acid digestion studies showed that the Fe content of the Fe/PEI-sorbent was 252 mg/g.

6.16. Arsenic Sorbent Preparation

To a round bottomed flask was added 20 mL of water and the solution was bubbled with nitrogen gas for 3 hours. The flask was heated to 70° C. and 10.0 g of $FeSO_4$—$7H_2O$ was added while the solution was kept under a nitrogen atmosphere. After dissolution of the iron, 6.0 g of the P-dendrimer solid sorbent was added, and the mixture was stirred for 3 hours. The solid in the media was converted completely from white to turquoise. The reaction mixture was filtered and the solids were allowed exposed to air for 12 hours, undergoing a color change to orange/red, to oxidize the Fe(II) species to Fe(III). The remaining solids were crushed with a mortar and pestle and washed with 1.0 L of water to elute any unbound iron and dried under vacuum at 50° C. for 24 hours to afford the Fe/PEI-sorbent.

6.17. Comparison Arsenic Removal with Functionalized and Unfunctionalized Solid Sorbents Batch testing for the As removal efficiency of the Fe/PEI-sorbent was examined on modeled ground brine water, which contained approximately As(III) (2,500 μg/L), As(V) (2,500 μg/L), B (15,000 μg/L), Mn(II) (2,500 μg/L), and NaCl (1030 mg/L) at pH 7.5, and all metal analyses were determined via ICP-MS. Treating the brine water with the Fe/PEI-sorbent on 5 g/L loading achieved 96% As and 2.3% Mn removal over 12 hours (FIG. 20). The Fe/PEI-sorbent showed no affinity towards B and NaCl species. Treatment of the brine water with the unfunctionalized sorbent inversed the selectivity removing 99% of Mn and 11.8% of As, with no affinity towards B and NaCl (FIG. 20). The majority of the Fe/PEI-sorbent's amine functionality is coordinated to Fe(III) oxides, leaving few amines available to bind to Mn, allowing the sorbent to be highly selective towards As species. The unfunctionalized RTI PEI-sorbent is a highly active chelator proving unsurprisingly effective to remove Mn from the brine.

6.18. Sorbent Loading Effect on Arsenic Removal

The loading of the Fe/PEI-sorbent has a correlative effect on the As removal efficiency. Loading the sorbent above 1 g/L provided As removal efficiencies above 90% over batch testing (FIG. 21). Decreasing the loading to 0.25 g/L maintained an As removal efficiency of 75.5%. The quantity of As that can be removed using the Fe/PEI-sorbent is directly associated to the iron content of the sorbent.

6.19. Kinetics of Arsenic Removal

The batch As removal kinetics were rapid upon initial contact of the sorbent at 1 g/L treatment loading (FIG. 22). Within 5 minutes, over 60% of the combined As species were removed, and at 60 minutes 75% As removal was achieved. Extending the contact time to 10 hours resulted in 93% As removal efficiency by the Fe/PEI-sorbent. After 75% As removal at 60 minutes, a significant number of Fe(III) oxide active sites had been consumed by As ions. The reduced number of active Fe(III) oxide sites coupled with even greater diluted As ions presented diffusion limited adsorption. The rapid kinetics for As removal are highly promising for flow processes required for adding on the sorbent technology to the membrane system.

6.20. pH Effect on Arsenic Removal

Additionally, the effect of the brine water's pH on the sorbent's As removal efficiency was examined via batch testing. Impressively, the Fe/PEI-sorbent maintained As removal efficiencies >90% across highly acidic (pH 2, 90% removal efficiency) and highly basic (pH 12, 99% removal efficiency) conditions (FIG. 23). The predominate arsenate species at near neutral pH are $HAsO_2$ for As(III) and $H_2AsO_4^-$ and $H_2AsO_4^{2-}$ for As(V). At higher pH values the anionic arsenate species dominate affording higher associative values for removal by Fe(III) oxides. Importantly, the Fe/PEI-sorbent is effective for removing As within the common ground water pH range of 6-8.

6.21. Regeneration of Iron-Modified Sorbent for Arsenic Removal

Two potential application pathways for this sorbent are as a one-time-use material, where an As saturated sorbent is disposed of in a landfill and replaced, or as a regenerative sorbent, where an As saturated sorbent can be regenerated by removing adsorbed As for repeated use. In either scenario, the sorbent must not leach As upon saturation. The potential for As leaching was examined first by treating 200 mL of As, B, and Mn brine water with 1 g of the Fe/PEI-sorbent (5 g/L loading ratio). Over 12 hours the sorbent removed 94.7% As from the brine water. Washing the filtered sorbent with 100 mL of DI water showed ~200 µg/L of As leaching from the sorbent, while fractions collected after 1 L of DI water washing reduced the leached As to less than 10 µg/L. The Fe/PEI-sorbent retains brine water via swelling of the polymer channels. The initial wash water replaces brine water trapped in the swelled polymer, accounting for the initially leached As. Importantly, the sorbent does not leach As from flowing water.

Regeneration of the Fe/PEI-sorbent was next examined. The sorbent was washed with 0.1 M aqueous NaOH, and 4,500 µg/L As was observed in the initial wash fractions and less than 40 µg/L As was observed after 1 L of the basic washing. Examination of the recycled sorbent by SEM and FTIR showed no distinct structural or chemical changes occurring from pre-treatment to post-regeneration. Treatment of a new brine solution with the regenerated sorbent via batch testing achieved 95% As removal. Preliminary evidence of the recyclability of the Fe/PEI-sorbent is highly promising for its use as an As removal sorbent. To address the removal of Mn from the brine water, a brine solution was treated with an equal portion of the Fe/PEI-sorbent and the unfunctionalized PEI-sorbent in 5 g/L loadings. The treated brine water showed 94.7% As removal and 98.9% Mn removal. The filtered sorbents were washed with 0.1 M aqueous NaOH and exposed to a new brine solution. The removal efficiency of the recycled combined sorbent mixture was 95.1% for As and 99.8% for Mn. RTI's sorbent's can be engineered to posses both free amine and Fe(III) oxide functionalities to address both As and Mn removal based off the preliminary data.

6.22. Introduction: Selenium Removal

Selenium (Se) is a naturally occurring element that plays vital roles in human cellular functions at trace levels, however, Se becomes toxic in high dosages. Due to its beneficial health effects, Se is allowed in drinking water up to 50 ppb levels, set by the EPA, with its concentration controlled strictly. Selenium enters drinking water commonly from agricultural activities, mining, industrial waste, and via flue gas desulfurization.[12] The most common forms of selenium that present the highest health risk are inorganic selenite-Se (IV), ($SeO_3^{4-}$), and selenate-Se(VI), ($SeO_4^{2-}$). Technologies employed to remove aqueous selenium are based on coagulation, ion exchange, membrane filtration, and biological and chemical reduction. The wide-spread implementation of these technologies has been limited due to high operating costs, requirement of toxic chemical treatments, and toxic waste generation.[13] EPA's recommended technology involves Se precipitation with ferrihydrite, however, this method is not economical for removing Se below 50 ppb.[14] The use of iron oxides as adsorbents for selenium removal has attracted significant attention.[13,15-18] Iron oxide nanoparticles, $Fe_3O_4$, frequently have poor stability, solubility and dispersion effects in solution, making the modification of the iron oxides into more practical forms sought after.[19] In 1999, Min and Hering used Fe(III)-doped alginate gel biopolymers to remove Se(IV) with narrow pH ranges.[20] In 2008, Zhang et al. doped granular activated carbons with Fe(III) oxides to achieve >90% selenium removal over 5 hours with pH ranges of 2-8.[21] The use of modified polymers with iron oxides for selenium removal has not been reported to the best of our knowledge.

6.23. Selenite, Selenate, and Selenous Acid Removal with Solid Sorbent

Three aqueous inorganic selenium stock solutions were prepared: 1) 5000 ppb Se(IV), 2) 5000 ppb Se(VI), and 3) 2500 ppb Se(IV) and 2500 ppb Se(VI). Treatment of all these solutions with 5 g/L loading of the iron-functionalized solid sorbent removed Se below the detection limit of the ICP-MS (FIG. 24). This is the extremely promising for inorganic selenium removal. Treatment of the 2500 ppb Se(IV) and 2500 ppb Se(VI) stock solution with the unmodified sorbent achieved 87% removal efficiency over 12 hours.

Selenous acid, which is formed from the exposure of selenium dioxide to water, is another potential contaminating source of selenium from industrial waste. Treatment of a 6120 ppb (6.12 mg/L) solution of selenous acid, $H_2SeO_3$, by the solid sorbent achieved 57.5 removal (Table 2). Using the iron-modified solid sorbent, 99.9% of selenium was capable of being removed.

TABLE 2

Batch Removal of selenous acid, $H_2SeO_3$, by solid sorbent.

| Sorbent | Pre-Treatment (µg/mL) | Post-Treatment (µg/mL) | % Removal |
|---|---|---|---|
| PEI | 6.12 | 2.6 | 57.48% |
| Fe/PEI | 6.12 | 0.006 | 99.90% |

6.24. Rare Earth Element Sequestration by Solid Sorbent

A mixed REE solution was prepared with the following composition: 30 ppm each of monovalent ions Sc, La, Pr, Ce, Eu, Sm, Gd, Tb, Dy, Ho, Er, Yb, Lu, Nd, Th, Tm, Fe, K, Mn, and Mg. The modeled AMD REE solution had a pH of 3.3. A sorbent loading experiment was conducted to examine the REE removal efficiencies in the presence of common co-contaminants in AMD liquids (Fe, Mn, Mg, K) (FIG. 25). Treating this stock solution with 5 g/L loading of the solid sorbent was found to remove 100% of all the REEs except Nd. At the 5 g/L sorbent loading, 100% of Fe was removed, alongside 60% of Mn with no K or Mg selectivity. Decreasing the sorbent loading to 2 g/L completely removes Fe with decreased REE adsorption. Sc and La were each 20% adsorbed, while the remaining REEs were removed in 5-10 wt % efficiencies, demonstrating that more strongly Lewis acidic metals bind more effectively to the sorbent. Decreasing the sorbent loading to 0.5 g/L only sees Sc and La removal at 6% removal efficiency with no other REE adsorbed.

7. REFERENCES (1) Bhattacharyya, K. G.; Gupta, S. S. Kaolinite, Montmorillonite, and Their Modified Derivatives as Adsorbents for Removal of Cu(II) from Aqueous Solution. *Sep. Purif. Technol.* 2006, 50 (3), 388-397. https://doi.org/10.1016/j.seppur.2005.12.014.

(2) Eccles, H. Treatment of Metal-Contaminated Wastes: Why Select a Biological Process? *Trends Biotechnol.* 1999, 17 (12), 462-465. https://doi.org/10.1016/S0167-7799(99)01381-5.

(3) Wang, X.; Deng, W.; Xie, Y.; Wang, C. Selective Removal of Mercury Ions Using a Chitosan—Poly(Vinyl Alcohol) Hydrogel Adsorbent with Three-Dimensional Network Structure. *Chem. Eng. J.* 2013, 228, 232-242. https://doi.org/10.1016/j.cej.2013.04.104.

(4) Kumiawan, T. A.; Chan, G. Y. S.; Lo, W.; Babel, S. Comparisons of Low-Cost Adsorbents for Treating Wastewaters Laden with Heavy Metals. *Sci. Total Environ.* 2006, 366 (2), 409-426. https://doi.org/10.1016/j.scitotenv.2005.10.001.

(5) Lapwanit, S.; Trakulsujaritchok, T.; Nongkhai, P. N. Chelating Magnetic Copolymer Composite Modified by Click Reaction for Removal of Heavy Metal Ions from Aqueous Solution. *Chem. Eng. J.* 2016, 289, 286-295. https://doi.org/10.1016/j.cej.2015.12.073.

(6) Sajid, M.; Nazal, M. K.; Ihsanullah; Baig, N.; Osman, A. M. Removal of Heavy Metals and Organic Pollutants from Water Using Dendritic Polymers Based Adsorbents: A Critical Review. *Sep. Purif. Technol.* 2018, 191, 400-423. https://doi.org/10.1016/j.seppur.2017.09.011.

(7) Barakat, M. A.; Ramadan, M. H.; Alghamdi, M. A.; Algamy, S. S.; Woodcock, H. L.; Kuhn, J. N. Remediation of Cu(II), Ni(II), and Cr(III) Ions from Simulated Wastewater by Dendrimer/Titania Composites. *J. Environ. Manage.* 2013, 117, 50-57. https://doi.org/10.1016/j.jenvman.2012.12.025.

(8) Thompson, S. J.; Soukri, M.; Lail, M. Phosphorous Dendrimer Bound Polyethyleneimine as Solid Sorbents for Post-Combustion CO2 Capture. *Chem. Eng. J.* 2018, 350, 1056-1065. https://doi.org/10.1016/j.cej.2018.06.060.

(9) Thompson, S. J.; Soukri, M.; Lail, M. Phosphorus Dendrimer Derived Solid Sorbents for CO2 Capture from Post-Combustion Gas Streams. *Energy Fuels* 2018, 32 (8), 8658-8667. https://doi.org/10.1021/acs.energyfuels.8b01764.

(10) *New Aspects in Phosphorus Chemistry II*; Majoral, J.-P., Ed.; Topics in Current Chemistry, New Aspects in Phosphorus Chemistry; Springer-Verlag: Berlin Heidelberg, 2003.

(11) Ahmed, E. M. Hydrogel: Preparation, Characterization, and Applications: A Review. *J. Adv. Res.* 2015, 6 (2), 105-121. https://doi.org/10.1016/j.jare.2013.07.006.

(12) Lemly, A. D. Aquatic Selenium Pollution Is a Global Environmental Safety Issue. *Ecotoxicol. Environ. Saf* 2004, 59 (1), 44-56. https://doi.org/10.1016/S0147-6513(03)00095-2.

(13) Bleiman, N.; Mishael, Y. G. Selenium Removal from Drinking Water by Adsorption to Chitosan—Clay Composites and Oxides: Batch and Columns Tests. *J. Hazard. Mater.* 2010, 183 (1), 590-595. https://doi.org/10.1016/j.jhazmat.2010.07.065.

(14) MSE, T. A. I. *Selenium Treatment/Removal Alternatives Demponstration Project*; Mine Waste Technology Program Activity III, Project 20; 2001; p EPA/600/R-01/077.

(15) Yamani, J. S.; Lounsbury, A W ; Zimmerman, J. B. Adsorption of Selenite and Selenate by Nanocrystalline Aluminum Oxide, Neat and Impregnated in Chitosan Beads. *Water Res.* 2014, 50, 373-381. https://doi.org/10.1016/j.watres.2013.10.054.

(16) Wei, X.; Viadero, R. C. Synthesis of Magnetite Nanoparticles with Ferric Iron Recovered from Acid Mine Drainage: Implications for Environmental Engineering. *Colloids Surf. Physicochem. Eng. Asp.* 2007, 294 (1), 280-286. https://doi.org/10.1016/j.colsurfa.2006.07.060.

(17) Zelmanov, G.; Semiat, R. Selenium Removal from Water and Its Recovery Using Iron (Fe3+) Oxide/Hydroxide-Based Nanoparticles Sol (NanoFe) as an Adsorbent. *Sep. Purif. Technol.* 2013, 103, 167-172. https://doi.org/10.1016/j.seppur.2012.10.037.

(18) Semiat, R.; Zelmanov, G. Method for Removal of Selenium Contaminants from Aqueous Fluids. W02011016038A1, February 10, 2011.

(19) Xu, J.-K.; Zhang, F.-F.; Sun, J.-J.; Sheng, J.; Wang, F.; Sun, M. Bio and Nanomaterials Based on Fe3O4. *Molecules* 2014, 19 (12), 21506-21528. https://doi.org/10.3390/molecules191221506.

(20) Min, J. H.; Hering, J. G. Removal of Selenite and Chromate Using Iron(III)-Doped Alginate Gels. *Water Environ. Res.* 1999, 71 (2), 169-175.

(21) Zhang, N.; Lin, L.-S.; Gang, D. Adsorptive Selenite Removal from Water Using Iron-Coated GAC Adsorbents. *Water Res.* 2008, 42 (14), 3809-3816. https://doi.org/10.1016/j.watres.2008.07.025.

(22) Hatch, G. P. Dynamics in the Global Market for Rare Earths. *Elements* 2012, 8 (5), 341-346. https://doi.org/10.2113/gselements.8.5.341.

(23) Alonso, E.; Sherman, A. M.; Wallington, T. J.; Everson, M. P.; Field, F. R.; Roth, R.; Kirchain, R. E. Evaluating Rare Earth Element Availability: A Case with Revolutionary Demand from Clean Technologies. *Environ. Sci. Technol.* 2012, 46 (6), 3406-3414. https://doi.org/10.1021/es203518d.

(24) Noack, C. W.; Dzombak, D. A.; Karamalidis, A. K. Rare Earth Element Distributions and Trends in Natural Waters with a Focus on Groundwater. *Environ. Sci. Technol.* 2014, 48 (8), 4317-4326. https://doi.org/10.1021/es4053895.

(25) Welch, S. A.; Christy, A. G.; Isaacson, L.; Kirste, D. Mineralogical Control of Rare Earth Elements in Acid Sulfate Soils. *Geochim. Cosmochim. Acta* 2009, 73 (1), 44-64. https://doi.org/10.1016/j.gca.2008.10.017.

(26) Johannesson, K. H. *Rare Earth Elements in Groundwater Flow Systems*; Springer Science & Business Media, 2006.

(27) Merten, D.; Büchel, G. Determination of Rare Earth Elements in Acid Mine Drainage by Inductively Coupled Plasma Mass Spectrometry. *Microchim. Acta* 2004, 148 (3), 163-170. https://doi.org/10.1007/s00604-004-0260-0.

(28) Ziemkiewicz, P.; He, T.; Noble, A.; Liu, X. *Recovery of Rare Earth Elements (REEs) from Coal Mine Drainage*; Proc. 37th W. Virginia Surface mine Drainage Task Force Symposium, 2016.

(29) Hu, Y.; Drouin, E.; Larivière, D.; Kleitz, F.; Fontaine, F.-G. Highly Efficient and Selective Recovery of Rare Earth Elements Using Mesoporous Silica Functionalized by Pre-organized Chelating Ligands. *ACS Appl. Mater. Interfaces* 2017, 9 (44), 38584-38593. https://doi.org/10.1021/acsami.7b12589.

(30) Florek, J.; Giret, S.; Juère, E.; Larivière, D.; Kleitz, F. Functionalization of Mesoporous Materials for Lanthanide and Actinide Extraction. *Dalton Trans.* 2016, 45 (38), 14832-14854. https://doi.org/10.1039/C6DT00474A.

(31) Iannicelli-Zubiani, E. M.; Cristiani, C.; Dotelli, G.; Gallo Stampino, P.; Pelosato, R.; Mesto, E.; Schingaro, E.; Lacalamita, M. Use of Natural Clays as Sorbent Materials for Rare Earth Ions: Materials Characterization and Set up of the Operative Parameters. *Waste Manag.* 2015, 46, 546-556. https://doi.org/10.1016/j.wasman.2015.09.017.

(32) Chen, Y.; Zhu, C.; Sun, Y.; Duan, H.; Ye, W.; Wu, D. Adsorption of La(III) onto GMZ Bentonite: Effect of Contact Time, Bentonite Content, PH Value and Ionic Strength. *J. Radioanal. Nucl. Chem.* 2012, 292 (3), 1339-1347. https://doi.org/10.1007/s10967-012-1612-6.

(33) Zubiani, E. M. I.; Cristiani, C.; Dotelli, G.; Stampino, P. G.; Pelosato, R.; Bengo, I.; Masi, M. POLYMERS MODIFIED CLAYS FOR SEPARATING RARE EARTHS FROM WEEE *Environ. Eng. Manag. J.* 2013, 4.

(34) Florek, J.; Chalifour, F.; Bilodeau, F.; Larivière, D.; Kleitz, F. Nanostructured Hybrid Materials for the Selective Recovery and Enrichment of Rare Earth Elements. *Adv. Funct. Mater.* 2014, 24 (18), 2668-2676. https://doi.org/10.1002/adfm.201303602.

(35) Zheng, X.; Wang, C.; Dai, J.; Shi, W.; Yan, Y. Design of Mesoporous Silica Hybrid Materials as Sorbents for the Selective Recovery of Rare Earth Metals. *J. Mater. Chem. A* 2015, 3 (19), 10327-10335. https://doi.org/10.1039/C4TA06860B.

(36) Wilfong, W. C.; Kail, B. W.; Bank, T. L.; Howard, B. H.; Gray, M. L. Recovering Rare Earth Elements from Aqueous Solution with Porous Amine—Epoxy Networks. *ACS Appl. Mater. Interfaces* 2017, 9 (21), 18283-18294. https://doi.org/10.1021/acsami.7b03859.

(37) Wang, Q.; Wilfong, W. C.; Kail, B. W.; Yu, Y.; Gray, M. L. Novel Polyethylenimine-Acrylamide/SiO2 Hybrid Hydrogel Sorbent for Rare-Earth-Element Recycling from Aqueous Sources. *ACS Sustain. Chem. Eng.* 2017, 5 (11), 10947-10958. https://doi.org/10.1021/acssuschemeng.7b02851.

(38) Gao, Y.; Zhang, S.; Zhao, K.; Wang, Z.; Xu, S.; Liang, Z.; Wu, K. Adsorption of La3+and Ce3+by Poly-γ-Glutamic Acid Crosslinked with Polyvinyl Alcohol. *J. Rare Earths* 2015, 33 (8), 884-891. https://doi.org/10.1016/S1002-0721(14)60500-7.

(39) Borai, E. H.; Hamed, M. G.; El-kamash, A. M.; Siyam, T.; El-Sayed, G. 0. Synthesis, Characterization and Application of a Modified Acrylamide—Styrene Sulfonate Resin and a Composite for Sorption of Some Rare Earth Elements. *New J. Chem.* 2015, 39 (9), 7409-7420. https://doi.org/10.1039/C5NJ01479D.

(40) Borai, E. H.; Hamed, M. G.; El-kamash, A. M.; Siyam, T.; El-Sayed, G. 0. Template Polymerization Synthesis of Hydrogel and Silica Composite for Sorption of Some Rare Earth Elements. *J. Colloid Interface Sci.* 2015, 456, 228-240. https://doi.org/10.1016/j.jcis.2015.06.020.

(41) Xu, S.; Wang, Z.; Gao, Y.; Zhang, S.; Wu, K. Adsorption of Rare Earths(III) Using an Efficient Sodium Alginate Hydrogel Cross-Linked with Poly-γ-Glutamate. *PLOS ONE* 2015, 10 (5), e0124826. https://doi.org/10.1371/journal.pone.0124826.

(42) Zhu, Y.; Wang, W.; Zheng, Y.; Wang, F.; Wang, A. Rapid Enrichment of Rare-Earth Metals by Carboxymethyl Cellulose-Based Open-Cellular Hydrogel Adsorbent from HIPEs Template. *Carbohydr. Polym.* 2016, 140, 51-58. https://doi.org/10.1016/j.carbpol.2015.12.003.

(43) Kolesov, G. M.; Ermolaeva, V. N.; Mikhailova, A. V.; Kogarko, L. N. Hydrogels as New Concentrators of the Rare-Earth and Radioactive Elements after Their Leaching from the Rocks of the Lovozero Massif during INAA Determination. *Geochem. Int.* 2012, 50 (3), 304-307. https://doi.org/10.1134/S0016702912030068.

(44) Maeda, Y.; Zinchenko, A.; Lopatina, L. I.; Sergeyev, V. G.; Murata, S. Extraction of Noble and Rare-Earth Metals from Aqueous Solutions by DNA Cross-Linked Hydrogels. *ChemPlusChem* 2013, 78 (7), 619-622. https://doi.org/10.1002/cplu.201300047.

8. GENERALIZED STATEMENTS OF THE DISCLOSURE

The following numbered statements provide a general description of the disclosure and are not intended to limit the appended claims.

Statement 1: A method of removing a metal from an aqueous fluid stream which comprises contacting an aqueous fluid stream with a polyamine phosphorus dendrimer (P-dendrimer) having the formula I

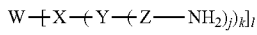

wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine having a Mw ranging from 400 to about 1,000,000, or a polypropyleneimine; j and k are numerical values corresponding to the branch point multiplicity and whose values independently range from 1 to 10; and l is a numerical value corresponding to the branch point multiplicity and whose values ranges from 2 to 10.

Statement 2: A method of adsorbing, separating, storing or sequestering a metal from an aqueous fluid stream, comprising contacting the aqueous fluid stream with a polyamine phosphorus dendrimer (P-dendrimer) having the formula I

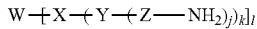

wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine, or a polypropyleneimine; j and k are numerical values corresponding to the branch point multiplicity and whose values independently range from 1 to 10; and l is a numerical value corresponding to the branch point multiplicity and whose values ranges from 2 to 10; so as to adsorb, separate, store or sequester the metal from the aqueous fluid stream.

Statement 3: The method of any of Statements 1-2, wherein the aqueous fluid stream has a pH between about 2.0 and about 12.0.

Statement 4: The method of any of Statements 1-3, wherein the aqueous fluid stream is a municipal waste water fluid stream.

Statement 5: The method of any of Statements 1-3, wherein the aqueous fluid stream is an industrial waste water fluid stream.

Statement 6: The method of any of Statements 1-3, wherein the aqueous fluid stream is a drinking water fluid stream.

Statement 7: The method of any of Statements 1-3, wherein the aqueous fluid stream comprises a leachate from a municipal waste landfill, hydraulic fracturing, an acid mine drainage, an acid mine sludge, or a coal-fired power plant.

Statement 8: The method of any of Statements 1-7, wherein the metal is a heavy metal.

Statement 9: The method of Statement 8, wherein the heavy metal is arsenic (As), cadmium, lead (Pb), mercury (Hg), selenium (Se), copper (Cu), zinc (Zn), iron (Fe), aluminum (Al), manganese (Mn), nickel (Ni) or magnesium (Mg).

Statement 10: The method of any of Statements 1-7, wherein the metal is a rare earth metal.

Statement 11: The method of Statement 10, wherein the rare earth metal is one or more of the following elements cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

Statement 12: The method of any of Statements 1-11, further comprising regenerating the polyamine P-dendrimer of formula I by contacting the P-dendrimer with a concentrated acidic solution.

Statement 13: The method of Statement 11, wherein the concentrated acidic solution is about 0.1 to about 5.0 M acetic acid or about 0.1 to about 5.0 M HCl.

Statement 14: The method of any of Statements 1-11, further comprising regenerating the polyamine P-dendrimer of formula I by contacting the P-dendrimer with a concentrated basic solution.

Statement 15: The method of Statement 13, wherein the concentrated basic solution is about 0.05 to about 2.0 M NaOH or about 0.05 to about 2.0 M ammonium citrate.

Statement 16: The method of any of Statements 1-3, further comprising contacting the polyamine P-dendrimer of formula I with an iron salt so as to form an iron supported polyamine P-dendrimer solid sorbent.

Statement 17: The method of Statement 16, wherein the iron supported polyamine P-dendrimer solid sorbent is used to remove adsorb, separate, store or sequester arsenic (As) or selenium (Se) from the aqueous fluid stream.

Statement 18: A process for the capture and removal of metals from an aqueous metal-containing stream the process comprising: (a) providing a housing having dispersed therein a sorbent comprising a polyamine phosphorus dendrimer (P-dendrimer) having the formula I

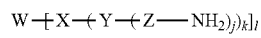

wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine having a Mw ranging from 400 to about 1,000,000, or a polypropyleneimine; j and k are numerical values corresponding to the branch point multiplicity and whose values independently range from 1 to 10; and l is a numerical value corresponding to the branch point multiplicity and whose values ranges from 2 to 10; (b) passing a metal-containing stream through the housing such that the metal-containing stream contacts the sorbent; (c) flushing the housing with a concentrated acidic stream to cause the sorbent to desorb a metal-retained therein and form a desorbed metal solution; and (d) flushing the housing to remove the desorbed metal from the housing.

Statement 19: The process of Statement 18, wherein the aqueous metal-containing fluid stream has a pH between about 2.0 and about 12.0.

Statement 20: The process of any of Statements 18-19, wherein the aqueous fluid stream is a municipal waste water fluid stream.

Statement 21: The process of any of Statements 18-19, wherein the aqueous fluid stream is an industrial waste water fluid stream.

Statement 22: The process of any of Statements 18-19, wherein the aqueous fluid stream is a drinking water fluid stream.

Statement 23: The process of any of Statements 18-19, wherein the aqueous fluid stream comprises a leachate from a municipal waste landfill, hydraulic fracturing, an acid mine drainage, an acid mine sludge, or a coal-fired power plant.

Statement 24: The process of any of Statements 18-23, wherein the metal is a heavy metal.

Statement 25: The process of Statement 24, wherein the heavy metal is arsenic (As), cadmium, lead (Pb), mercury (Hg), selenium (Se), copper (Cu), zinc (Zn), iron (Fe), aluminum (Al), manganese (Mn), nickel (Ni) or magnesium (Mg).

Statement 26: The process of any of Statements 18-23, wherein the metal is a rare earth metal.

Statement 27: The process of Statement 26, wherein the rare earth metal is one or more of the following elements cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

Statement 28: The process of any of Statements 18-27, further comprising regenerating the polyamine P-dendrimer of formula I by contacting the P-dendrimer with a concentrated acidic solution.

Statement 29: The process of Statement 28, wherein the concentrated acidic solution is about 0.1 to about 5.0 M acetic acid or about 0.1 to about 5.0 M HCl.

Statement 30: The process of any of Statements 18-27, further comprising regenerating the polyamine P-dendrimer of formula I by contacting the P-dendrimer with a concentrated basic solution.

Statement 31: The process of Statement 30, wherein the concentrated acidic solution is about 0.05 to about 2.0 M NaOH or about 0.05 to about 2.0 M ammonium citrate.

Statement 32: The process of any of Statements 18-19, further comprising contacting the polyamine P-dendrimer of formula I with an iron salt so as to form an iron supported polyamine P-dendrimer solid sorbent.

Statement 33: The process of Statement 15, wherein the iron supported polyamine P-dendrimer solid sorbent is used to remove adsorb, separate, store or sequester arsenic (As) or selenium (Se) from the aqueous fluid stream.

Statement 34: A sorbent comprising a sorbent comprising (a) iron II or iron III and (b) a polyamine phosphorus dendrimer (P-dendrimer) having the formula I

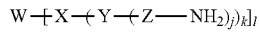
I wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine having a Mw ranging from 400 to about 1,000,000, or a polypropyleneimine; j and k are numerical values corresponding to the branch point multiplicity and whose values independently range from 1 to 10; and l is a numerical value corresponding to the branch point multiplicity and whose values ranges from 2 to 10.

Statement 35: The sorbent of Statement 33, wherein Z is polyethyleneimine.

It should be understood that the above description is only representative of illustrative embodiments and examples. For the convenience of the reader, the above description has focused on a limited number of representative examples of all possible embodiments, examples that teach the principles of the disclosure. The description has not attempted to exhaustively enumerate all possible variations or even combinations of those variations described. That alternate embodiments may not have been presented for a specific portion of the disclosure, or that further undescribed alternate embodiments may be available for a portion, is not to be considered a disclaimer of those alternate embodiments. One of ordinary skill will appreciate that many of those undescribed embodiments, involve differences in technology and materials rather than differences in the application of the principles of the disclosure. Accordingly, the disclosure is not intended to be limited to less than the scope set forth in the following claims and equivalents.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world. It is to be understood that, while the disclosure has been described in conjunction with the detailed description, thereof, the foregoing description is intended to illustrate and not limit the scope. Other aspects, advantages, and modifications are within the scope of the claims set forth below. All publications, patents, and patent applications cited in this specification are herein incorporated by reference as if each individual publication or patent application were specifically and individually indicated to be incorporated by reference.

What is claimed is:

1. A method of removing a metal from an aqueous fluid stream which comprises contacting an aqueous fluid stream with a polyamine phosphorus dendrimer (P-dendrimer) having the formula I

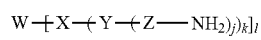
I wherein W is a phosphorus based dendrimer core; X is a polyfunctional aromatic linker; Y may be present or absent and if present is a polyfunctional amino phosphoryl group linked to the polyfunctional aromatic linker; Z is a polyethyleneimine having a Mw ranging from 400 to about 1,000,000 or a polypropyleneimine; j and k are numerical values corresponding to a branch point multiplicity and whose values independently range from 1 to 10; and l is a numerical value corresponding to the branch point multiplicity and whose values ranges from 2 to 10.

2. A method of adsorbing, separating, storing or sequestering a metal from an aqueous fluid stream, comprising contacting the aqueous fluid stream with a polyamine phosphorus dendrimer (P-dendrimer) having the formula I

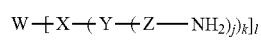
I wherein W is a phosphorus based dendrimer core; X is a polyfunctional aromatic linker; Y may be present or absent and if present is a polyfunctional amino phosphoryl group linked to the polyfunctional aromatic linker; Z is a polyethyleneimine or a polypropyleneimine; j and k are numerical values corresponding to a branch point multiplicity and whose values independently range from 1 to 10; and 1 is a numerical value corresponding to the branch point multiplicity and whose values ranges from 2 to 10;

so as to adsorb, separate, store or sequester the metal from the aqueous fluid stream.

3. The method of claim 1, wherein the aqueous fluid stream has a pH between about 2.0 and about 12.0.

4. The method of claim 1, wherein the aqueous fluid stream is a municipal waste water fluid stream, an industrial waste water fluid stream, or a drinking water fluid stream.

5. The method of claim 1, wherein the aqueous fluid stream comprises a leachate from a municipal waste landfill, hydraulic fracturing, an acid mine drainage, an acid mine sludge, or a coal-fired power plant.

6. The method of claim 1, wherein the metal is a heavy metal or a rare earth metal.

7. The method of claim 6, wherein the heavy metal is one or more of the following elements: arsenic (As), cadmium (Cd), lead (Pb), mercury (Hg), selenium (Se), copper (Cu), zinc (Zn), iron (Fe), aluminum (Al), manganese (Mn), nickel (Ni) or magnesium (Mg); or the rare earth metal is one or more of the following elements: cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), or yttrium (Y).

8. The method of claim 1, further comprising regenerating the polyamine P-dendrimer of formula I by contacting the P-dendrimer with a concentrated acidic solution or a concentrated basic solution.

9. The method of claim 8, wherein the concentrated acidic solution is about 0.1 to about 5.0 M acetic acid or about 0.1 to about 5.0 M HCl; or the concentrated basic solution is about 0.05 to about 2.0 M NaOH or about 0.05 to about 2.0 M ammonium citrate.

10. The method of claim 1, further comprising contacting the polyamine P-dendrimer of formula I with an iron salt so as to form an iron supported polyamine P-dendrimer solid sorbent.

11. The method of claim 10, wherein the iron supported polyamine P-dendrimer solid sorbent is used to remove adsorb, separate, store or sequester arsenic (As) or selenium (Se) from the aqueous fluid stream.

12. A process for the capture and removal of metals from an aqueous metal-containing stream the process comprising:
(a) providing a housing having dispersed therein a sorbent comprising a polyamine phosphorus dendrimer (P-dendrimer) having the formula I

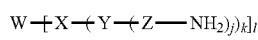

I wherein W is a phosphorus based dendrimer core; X is a polyfunctional aromatic linker; Y may be present or absent and if present is a polyfunctional amino phosphoryl group linked to the polyfunctional aromatic linker; Z is a polyethyleneimine having a Mw ranging from 400 to about 1,000,000 or a polypropyleneimine; j and k are numerical values corresponding to a branch point multiplicity and whose values independently range from 1 to 10; and 1 is a numerical value corresponding to the branch point multiplicity and whose values ranges from 2 to 10;
(b) passing a metal-containing stream through the housing such that the metal-containing stream contacts the sorbent;
(c) flushing the housing with a concentrated acidic stream to cause the sorbent to desorb a metal-retained therein and form a desorbed metal solution; and
(d) flushing the housing to remove the desorbed metal from the housing.

13. The process of claim 12, wherein the aqueous metal-containing fluid stream has a pH between about 2.0 and about 12.0.

14. The process of claim 12, wherein the aqueous fluid stream is a municipal waste water fluid stream, an industrial waste water fluid stream, or a drinking water fluid stream.

15. The process of claim 12, wherein the aqueous fluid stream comprises a leachate from a municipal waste landfill, hydraulic fracturing, an acid mine drainage, an acid mine sludge, or a coal-fired power plant.

16. The process of claim 12, wherein the metal is a heavy metal or a rare earth metal.

17. The process of claim 16, wherein the heavy metal is one or more of the following elements: arsenic (As), cadmium, lead (Pb), mercury (Hg), selenium (Se), copper (Cu), zinc (Zn), iron (Fe), aluminum (Al), manganese (Mn), nickel (Ni) or magnesium (Mg); or
the rare earth metal is one or more of the following elements: cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), or yttrium (Y).

18. The process of claim 12, further comprising regenerating the polyamine P-dendrimer of formula I by contacting the P-dendrimer with a concentrated acidic solution or a concentrated basic solution.

19. The method of claim 8, wherein the concentrated acidic solution is about 0.1 to about 5.0 M acetic acid or about 0.1 to about 5.0 M HCl; or the concentrated basic solution is about 0.05 to about 2.0 M NaOH or about 0.05 to about 2.0 M ammonium citrate.

20. The process of claim 12, further comprising contacting the polyamine P-dendrimer of formula I with an iron salt so as to form an iron supported polyamine P-dendrimer solid sorbent.

21. The process of claim 20, wherein the iron supported polyamine P-dendrimer solid sorbent is used to remove adsorb, separate, store or sequester arsenic (As) or selenium (Se) from the aqueous fluid stream.

* * * * *